(12) United States Patent
Muthler et al.

(10) Patent No.: US 11,663,770 B2
(45) Date of Patent: May 30, 2023

(54) HARDWARE-BASED TECHNIQUES APPLICABLE FOR RAY TRACING FOR EFFICIENTLY REPRESENTING AND PROCESSING AN ARBITRARY BOUNDING VOLUME

(71) Applicant: NVIDIA Corporation, Santa Clara, CA (US)

(72) Inventors: Gregory Muthler, Chapel Hill, NC (US); John Burgess, Austin, TX (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 17/681,168

(22) Filed: Feb. 25, 2022

(65) Prior Publication Data
US 2022/0180593 A1 Jun. 9, 2022

Related U.S. Application Data

(63) Continuation of application No. 16/897,764, filed on Jun. 10, 2020, now Pat. No. 11,295,508.

(51) Int. Cl.
*G06T 15/06* (2011.01)
*G06T 15/08* (2011.01)
*G06T 17/10* (2006.01)
*G06T 17/00* (2006.01)
*G06F 9/50* (2006.01)

(52) U.S. Cl.
CPC ............ *G06T 15/06* (2013.01); *G06F 9/5027* (2013.01); *G06T 15/08* (2013.01); *G06T 17/005* (2013.01); *G06T 17/10* (2013.01); *G06T 2210/12* (2013.01)

(58) Field of Classification Search
None
See application file for complete search history.

(56) References Cited

U.S. PATENT DOCUMENTS 11,295,508 B2* 4/2022 Muthler ............... G06T 15/08
2016/0071313 A1* 3/2016 Laine ................... G06T 15/10
345/419

* cited by examiner

*Primary Examiner* — Nurun Flora
(74) *Attorney, Agent, or Firm* — Nixon & Vanderhye P.C.

(57) ABSTRACT

A bounding volume is used to approximate the space an object occupies. If a more precise understanding beyond an approximation is required, the object itself is then inspected to determine what space it occupies. Often, a simple volume (such as an axis-aligned box) is used as bounding volume to approximate the space occupied by an object. But objects can be arbitrary, complicated shapes. So a simple volume often does not fit the object very well. That causes a lot of space that is not occupied by the object to be included in the approximation of the space being occupied by the object. Hardware-based techniques are disclosed herein, for example, for efficiently using multiple bounding volumes (such as axis-aligned bounding boxes) to represent, in effect, an arbitrarily shaped bounding volume to better fit the object, and for using such arbitrary bounding volumes to improve performance in applications such as ray tracing.

20 Claims, 20 Drawing Sheets

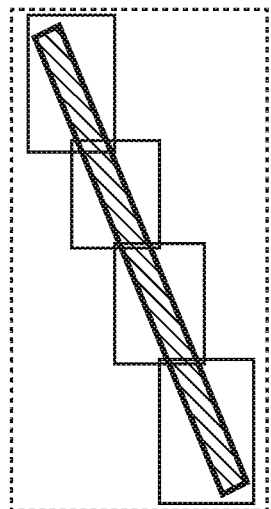 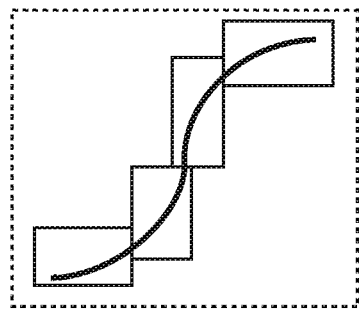 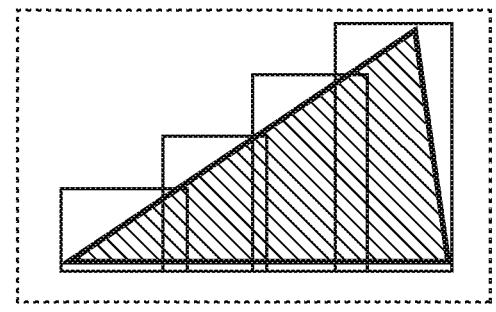
FIG. 2A  FIG. 2B  FIG. 2C
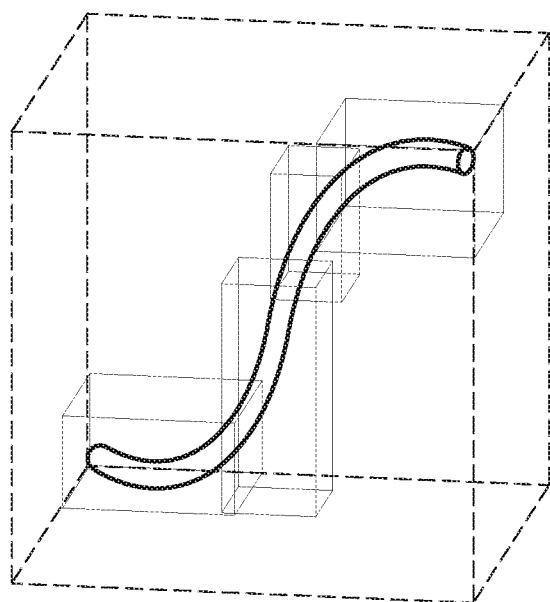 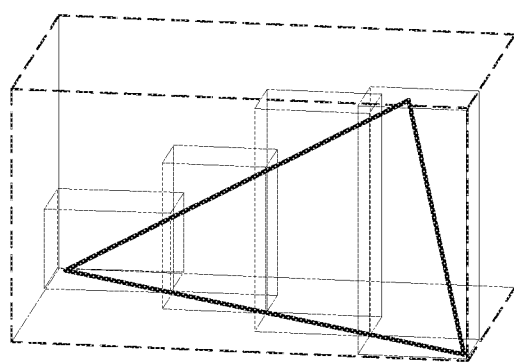
FIG. 2B-1  FIG. 2C-1

BLAS: TLAS Leaf (No Multi-Box): TLAS Leaf (Multi-Box):
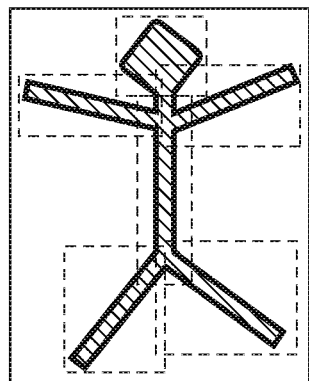
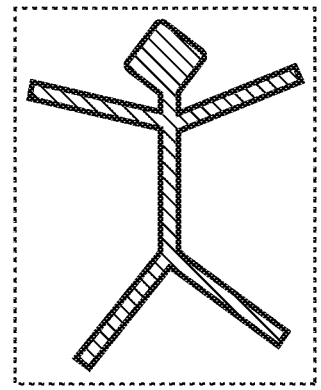
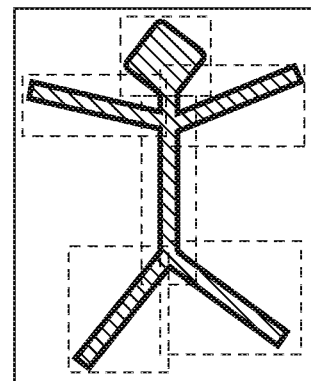
FIG. 4A  FIG. 4B  FIG. 4C
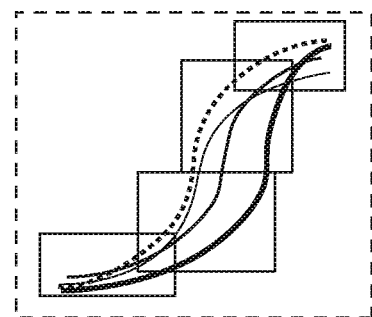
FIG. 5A
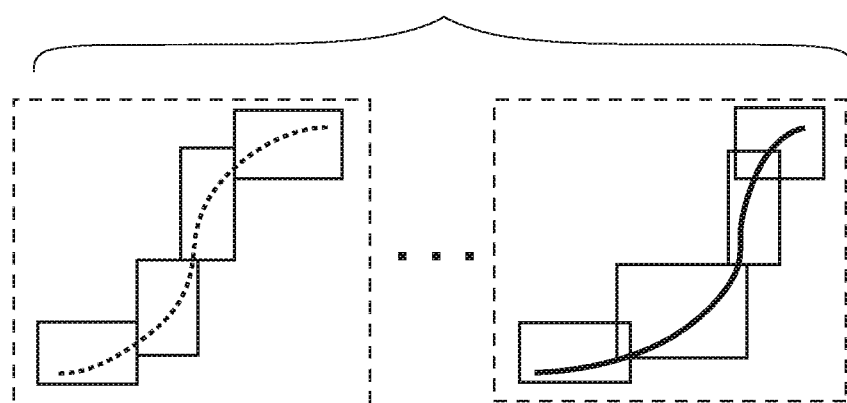
FIG. 5B 2- box Complet

| mode | multi-box count | • • • | header |
|---|---|---|---|
| child 0 | child 0 box 1 | | children |
| child 2 | child 2 box 1 | | |
| child 4 | child 4 box 1 | | |
| child 6 | child 6 box 1 | | |
| child 8 | child 8 box 1 | | |
| child 10 | child 10 box 1 / extended header | | |

3- box Complet

| mode | multi-box count | • • • | header |
|---|---|---|---|
| child 0 | child 0 box 1 | | children |
| child 0 box 2 | child 3 | | |
| child 3 box 1 | child 3 box 2 | | |
| child 6 | child 6 box 1 | | |
| child 6 box 2 | child 9 | | |
| child 9 box 1 | child 9 box 2 / extended header | | |

4- box Complet

| mode | multi-box count | • • • | header |
|---|---|---|---|
| child 0 | child 0 box 1 | | children |
| child 0 box 2 | child 0 box 3 | | |
| child 4 | child 4 box 1 | | |
| child 4 box 2 | child 4 box 3 | | |
| child 8 | child 8 box 1 | | |
| child 8 box 2 | child 8 box 3 / extended header | | |

6- box Complet

| mode | multi-box count | • • • | header |
|---|---|---|---|
| child 0 | child 0 box 1 | | children |
| child 0 box 2 | child 0 box 3 | | |
| child 0 box 4 | child 0 box 5 | | |
| child 6 | child 6 box 1 | | |
| child 6 box 2 | child 6 box 3 | | |
| child 6 box 4 | child 6 box 5 / extended header | | |

12- box Complet

| mode | multi-box count | • • • | header |
|---|---|---|---|
| child 0 | child 0 box 1 | | children |
| child 0 box 2 | child 0 box 3 | | |
| child 0 box 4 | child 0 box 5 | | |
| child 0 box 6 | child 0 box 7 | | |
| child 0 box 8 | child 0 box 9 | | |
| child 0 box 10 | child 0 box 11 / extended header | | |

FIG. 8

Example Ray Tracing Shading Pipeline

FIG. 12 TRAVERSAL COPROCESSOR

TTU Processing

TTU Processing

```
Layer 1  (2 box answer): [0,1] [2,3] [4,5] [6,7] [8,9] [A,B]
Layer 2a (3 box answer): [01,2] [3,45] [67,8] [9,AB]
Layer 2b (4 box answer): [01,23] [45,67] [89, AB]
Layer 3  (6 box answer): [0123, 45] [67, 89AB]
Layer 4 (12 box answer): [012345, 6789AB]
```

FIG. 16

```
// Decode multiBoxCount field into number
int decodeMultiBoxCount(int multiBoxCount) {
  int boxCount = 2;
  switch(multiBoxCount) {
  case 0: boxCount = 2; break;
  case 1: boxCount = 3; break;
  case 2: boxCount = 4; break;
  case 3: boxCount = 6; break;
  case 4: boxCount = 12; break;
  default: break;
  }
  return boxCount;
}

// Combine state over multiple boxes
// E.g., hit/miss with boxCount==2:
//   hit[0] |= hit[1];
//   hit[1]  = false;
//   hit[2] |= hit[3];
//   hit[3]  = false;
//   ...
// And boxCount==3:
//   hit[0] |= hit[1];
//   hit[1]  = false;
//   hit[0] |= hit[2];
//   hit[2]  = false;
//   ...
void combineMultiBoxState(int multiBoxCount, bool& state[12]) {
  int boxCount = decodeMultiBoxCount(multiBoxCount);
  for (int i = 0; i < 12; i += boxCount) {
    for (int b = 1; b < boxCount; b++) {
      state[i]   |= state[i+b];
      state[i+b]  = false;
    }
  }
} void TL::processRCTOutput(...) {
  // Combine state at the beginning of TL...
  combineMultiBoxState(multiBoxCount, hit);
  ...
  // Do the other TL stuff...
  ...
}
```

FIG. 17

Example Process To Generate an Image

HARDWARE-BASED TECHNIQUES APPLICABLE FOR RAY TRACING FOR EFFICIENTLY REPRESENTING AND PROCESSING AN ARBITRARY BOUNDING VOLUME

CROSS-REFERENCE TO RELATED PATENTS AND APPLICATIONS

The present application is a continuation of application Ser. No. 16/897,764 filed Jun. 10, 2020, now U.S. Pat. No. 11,295,508, which is incorporated herein by reference in its entirety and for all purposes.

This application is related to the following commonly-assigned US patents and patent applications, the entire contents of each of which are incorporated by reference:
- U.S. application Ser. No. 14/563,872 titled "Short Stack Traversal of Tree Data Structures" filed Dec. 8, 2014;
- U.S. Pat. No. 9,582,607 titled "Block-Based Bounding Volume Hierarchy";
- U.S. Pat. No. 9,552,664 titled "Relative Encoding For A Block-Based Bounding Volume Hierarchy";
- U.S. Pat. No. 9,569,559 titled "Beam Tracing";
- U.S. Pat. No. 10,025,879 titled "Tree Data Structures Based on a Plurality of Local Coordinate Systems";
- U.S. application Ser. No. 14/737,343 titled "Block-Based Lossless Compression of Geometric Data" filed Jun. 11, 2015;
- U.S. patent application Ser. No. 16/101,066 titled Method for Continued Bounding Volume Hierarchy Traversal on Intersection Without Shader Intervention;
- U.S. patent application Ser. No. 16/101,109 titled "Method for Efficient Grouping of Cache Requests for Datapath Scheduling";
- U.S. patent application Ser. No. 16/101,247 titled "A Robust, Efficient Multiprocessor-Coprocessor Interface";
- U.S. patent application Ser. No. 16/101,180 titled "Query-Specific Behavioral Modification of Tree Traversal";
- U.S. patent application Ser. No. 16/101,148 titled "Conservative Watertight Ray Triangle Intersection";
- U.S. patent application Ser. No. 16/101,196 titled "Method for Handling Out-of-Order Opaque and Alpha Ray/Primitive Intersections"; and
- U.S. patent application Ser. No. 16/101,232 titled "Method for Forward Progress and Programmable Timeouts of Tree Traversal Mechanisms in Hardware".

FIELD

The present technology relates to computer graphics, and more particularly to ray tracers. More particularly, the technology relates to hardware acceleration of computer graphics processing including but not limited to ray tracing. The example non-limiting technology herein also relates to efficient ray-primitive wide complet based intersection tests for geometry that does not tightly fit into single, axis-aligned bounding boxes.

BACKGROUND & SUMMARY

Real time computer graphics have advanced tremendously over the last 30 years. With the development in the 1980's of powerful graphics processing units (GPUs) providing 3D hardware graphics pipelines, it became possible to produce 3D graphical displays based on texture-mapped polygon primitives in real time response to user input. Such real time graphics processors were built upon a technology called scan conversion rasterization, which is a means of determining visibility from a single point or perspective. Using this approach, three-dimensional objects are modelled from surfaces constructed of geometric primitives, typically polygons such as triangles. The scan conversion process establishes and projects primitive polygon vertices onto a view plane and fills in the points inside the edges of the primitives. See e.g., Foley, Van Dam, Hughes et al, Computer Graphics: Principles and Practice (2d Ed. Addison-Wesley 1995 & 3d Ed. Addison-Wesley 2014).

Hardware has long been used to determine how each polygon surface should be shaded and texture-mapped and to rasterize the shaded, texture-mapped polygon surfaces for display. Typical three-dimensional scenes are often constructed from millions of polygons. Fast modern GPU hardware can efficiently process many millions of graphics primitives for each display frame (every $\frac{1}{30}^{th}$ or $\frac{1}{60}^{th}$ of a second) in real time response to user input. The resulting graphical displays have been used in a variety of real time graphical user interfaces including but not limited to augmented reality, virtual reality, video games and medical imaging. But traditionally, such interactive graphics hardware has not been able to accurately model and portray reflections and shadows.

There is another graphics technology which does perform physically realistic visibility determinations for reflection and shadowing. It is called "ray tracing". Ray tracing refers to casting a ray into a scene and determining whether and where that ray intersects the scene's geometry. This basic ray tracing visibility test is the fundamental primitive underlying a variety of rendering algorithms and techniques in computer graphics. Ray tracing was developed at the end of the 1960's and was improved upon in the 1980's. See e.g., Appel, "Some Techniques for Shading Machine Renderings of Solids" (SJCC 1968) pp. 27-45; Whitted, "An Improved Illumination Model for Shaded Display" Pages 343-349 Communications of the ACM Volume 23 Issue 6 (June 1980); and Kajiya, "The Rendering Equation", Computer Graphics (SIGGRAPH 1986 Proceedings, Vol. 20, pp. 143-150). Since then, ray tracing has been used in non-real time graphics applications such as design and film making. Anyone who has seen "Finding Dory" (2016) or other Pixar animated films has seen the result of the ray tracing approach to computer graphics—namely realistic shadows and reflections. See e.g., Hery et al, "Towards Bidirectional Path Tracing at Pixar" (2016).

Generally, ray tracing is a rendering method in which rays are used to determine the visibility of various elements in the scene. Ray tracing is a primitive used in a variety of rendering algorithms including for example path tracing and Metropolis light transport. In an example algorithm, ray tracing simulates the physics of light by modeling light transport through the scene to compute all global effects (including for example reflections from shiny surfaces) using ray optics. In such uses of ray tracing, an attempt may be made to trace each of many hundreds or thousands of light rays as they travel through the three-dimensional scene from potentially multiple light sources to the viewpoint. Often, such rays are traced relative to the eye through the scene and tested against a database of all geometry in the scene. The rays can be traced forward from lights to the eye, or backwards from the eye to the lights, or they can be traced to see if paths starting from the virtual camera and starting at the eye have a clear line of sight. The testing determines either the nearest intersection (in order to determine what is visible from the eye) or traces rays from the surface of an object toward a light source to determine if there is anything intervening that would block the transmission of light to that point in space. Because the rays are similar to the rays of light in reality, they make available a number of realistic effects that are not possible using the raster based real time 3D graphics technology that has been implemented over the last thirty years. Because each illuminating ray from each light source within the scene is evaluated as it passes through each object in the scene, the resulting images can appear as if they were photographed in reality. Accordingly, these ray tracing methods have long been used in professional graphics applications such as design and film, where they have come to dominate over raster-based rendering.

Ray tracing can be used to determine if anything is visible along a ray (for example, testing for occluders between a shaded point on a geometric primitive and a point on a light source) and can also be used to evaluate reflections (which may for example involve performing a traversal to determine the nearest visible surface along a line of sight so that software running on a streaming processor can evaluate a material shading function corresponding to what was hit—which in turn can launch one or more additional rays into the scene according to the material properties of the object that was intersected) to determine the light returning along the ray back toward the eye. In classical Whitted-style ray tracing, rays are shot from the viewpoint through the pixel grid into the scene, but other path traversals are possible. Typically, for each ray, the closest object is found. This intersection point can then be determined to be illuminated or in shadow by shooting a ray from it to each light source in the scene and finding if any objects are in between. Opaque objects block the light, whereas transparent objects attenuate it. Other rays can be spawned from an intersection point. For example, if the intersecting surface is shiny or specular, rays are generated in the reflection direction. The ray may accept the color of the first object intersected, which in turn has its intersection point tested for shadows. This reflection process is recursively repeated until a recursion limit is reached or the potential contribution of subsequent bounces falls below a threshold. Rays can also be generated in the direction of refraction for transparent solid objects, and again recursively evaluated. Ray tracing technology thus allows a graphics system to develop physically correct reflections and shadows that are not subject to the limitations and artifacts of scan conversion techniques.

Ray tracing has been used together with or as an alternative to rasterization and z-buffering for sampling scene geometry. It can also be used as an alternative to (or in combination with) environment mapping and shadow texturing for producing more realistic reflection, refraction and shadowing effects than can be achieved via texturing techniques or other raster "hacks". Ray tracing may also be used as the basic primitive to accurately simulate light transport in physically-based rendering algorithms such as path tracing, photon mapping, Metropolis light transport, and other light transport algorithms.

The main challenge with ray tracing has generally been speed. Ray tracing requires the graphics system to compute and analyze, for each frame, each of many millions of light rays impinging on (and potentially reflected by) each surface making up the scene. In the past, this enormous amount of computation complexity was impossible to perform in real time.

One reason modern GPU 3D graphics pipelines are so fast at rendering shaded, texture-mapped surfaces is that they use coherence efficiently. In conventional scan conversion, everything is assumed to be viewed through a common window in a common image plane and projected down to a single vantage point. Each triangle or other primitive is sent through the graphics pipeline and covers some number of pixels. All related computations can be shared for all pixels rendered from that triangle. Rectangular tiles of pixels corresponding to coherent lines of sight passing through the window may thus correspond to groups of threads running in lock-step in the same streaming processor. All the pixels falling between the edges of the triangle are assumed to be the same material running the same shader and fetching adjacent groups of texels from the same textures. In ray tracing, in contrast, rays may start or end at a common point (a light source, or a virtual camera lens) but as they propagate through the scene and interact with different materials, they quickly diverge. For example, each ray performs a search to find the closest object. Some caching and sharing of results can be performed, but because each ray potentially can hit different objects, the kind of coherence that GPU's have traditionally taken advantage of in connection with texture mapped, shaded triangles is not present (e.g., a common vantage point, window and image plane are not there for ray tracing). This makes ray tracing much more computationally challenging than other graphics approaches—and therefore much more difficult to perform on an interactive basis.

In 2010, NVIDIA took advantage of the high degree of parallelism of NVIDIA GPUs and other highly parallel architectures to develop the OptiX™ ray tracing engine. See Parker et al., "OptiX: A General Purpose Ray Tracing Engine" (ACM Transactions on Graphics, Vol. 29, No. 4, Article 66, July 2010). In addition to improvements in API's (application programming interfaces), one of the advances provided by OptiX™ was improving the acceleration data structures used for finding an intersection between a ray and the scene geometry. Such acceleration data structures are usually spatial or object hierarchies used by the ray tracing traversal algorithm to efficiently search for primitives that potentially intersect a given ray. OptiX™ provides a number of different acceleration structure types that the application can choose from. Each acceleration structure in the node graph can be a different type, allowing combinations of high-quality static structures with dynamically updated ones.

The OptiX™ programmable ray tracing pipeline provided significant advances, but was still generally unable by itself to provide real time interactive response to user input on relatively inexpensive computing platforms for complex 3D scenes. Since then, NVIDIA has been developing hardware acceleration capabilities for ray tracing. See e.g., U.S. Pat. Nos. 9,582,607; 9,569,559; US20160070820; US20160070767; and the other US patents and patent applications cited above.

A basic task for most ray tracers is to test a ray against all primitives (commonly triangles in one embodiment) in the scene and report either the closest hit (according to distance measured along the ray) or simply the first (not necessarily closest) hit encountered, depending upon use case. The naïve algorithm would be an O(n) brute-force search. However, due to the large number of primitives in a 3D scene of arbitrary complexity, it usually is not efficient or feasible for a ray tracer to test every geometric primitive in the scene for an intersection with a given ray.

By pre-processing the scene geometry and building a suitable acceleration data structure in advance, however, it is possible to reduce the average-case complexity to O(log n). Acceleration data structures, such as a bounding volume hierarchy or BVH, allow for quick determination as to which bounding volumes can be ignored, which bounding volumes may contain intersected geometric primitives, and which intersected geometric primitives matter for visualization and which do not. Using simple volumes such as boxes to contain more complex objects provides computational and memory efficiencies that help enable ray tracing to proceed in real time.

FIGS. 1A-1C illustrate ray tracing intersection testing in the context of a bounding volume 208 including geometric mesh 320. FIG. 1A shows a ray 302 in a virtual space including bounding volumes 310 and 315. To determine whether the ray 302 intersects geometry in the mesh 320, each geometric primitive (e.g., triangle) could be directly tested against the ray 302. But to accelerate the process (since the object could contain many thousands of geometric primitives), the ray 302 is first tested against the bounding volumes 310 and 315. If the ray 302 does not intersect a bounding volume, then it does not intersect any geometry inside of the bounding volume and all geometry inside the bounding volume can be ignored for purposes of that ray. Because in FIG. 1A the ray 302 misses bounding volume 310, any geometry of mesh 320 within that bounding volume need not be tested for intersection. While bounding volume 315 is intersected by the ray 302, bounding volume 315 does not contain any geometry and so no further testing is required.

On the other hand, if a ray such as ray 304 shown in FIG. 1B intersects a bounding volume 310 that contains geometry, then the ray may or may not intersect the geometry inside of the bounding volume so further tests need to be performed on the geometry itself to find possible intersections. Because the rays 304, 306 in FIGS. 1B and 1C intersect a bounding volume 310 that contains geometry, further tests need to be performed to determine whether any (and which) of the primitives inside of the bounding volume are intersected. In FIG. 1B, further testing of the intersections with the primitives would indicate that even though the ray 304 passes through the bounding volume 310, it does not intersect any of the geometry the bounding volume encloses (alternatively, as mentioned above, bounding volume 310 could be further volumetrically subdivided so that a bounding volume intersection test could be used to reveal that the ray does not intersect any geometry or more specifically which geometric primitives the ray may intersect).

FIG. 1C shows a situation in which the ray intersects bounding volume 310 and contains geometry that ray 306 intersects. To perform real time ray tracing, an intersection tester tests each geometric primitive within the intersected bounding volume 310 to determine whether the ray intersects that geometric primitive.

The acceleration data structure most commonly used by modern ray tracers is a bounding volume hierarchy (BVH) comprising nested axis-aligned bounding boxes (AABBs). The leaf nodes of the BVH contain the primitives (e.g., triangles) to be tested for intersection. The BVH is most often represented by a graph or tree structure data representation. In ray tracing, the time for finding the closest (or for shadows, any) intersection for a ray is typically order O(log n) for n objects when such an acceleration data structure is used. For example, AABB bounding volume hierarchies (BVHs) of the type commonly used for modern ray tracing acceleration data structures typically have an O(log n) search behavior.

The BVH acceleration data structure represents and/or references the 3D model of an object or a scene in a manner that will help assist in quickly deciding which portion of the object a particular ray is likely to intersect and quickly rejecting large portions of the scene the ray will not intersect. The BVH data structure represents a scene or object with a bounding volume and subdivides the bounding volume into smaller and smaller bounding volumes terminating in leaf nodes containing geometric primitives. The bounding volumes are hierarchical, meaning that the topmost level encloses the level below it, that level encloses the next level below it, and so on. In one embodiment, leaf nodes can potentially overlap other leaf nodes in the bounding volume hierarchy.

NVIDIA's RTX platform includes a ray tracing technology that brings real-time, cinematic-quality rendering to content creators and game developers. See https://developer.nvidia.com/rtx/ravtracing. In many or most implementations including NVIDIA RT Cores, the bounding volumes such as shown in FIG. 1A-1C use axis-aligned bounding boxes ("AABBs"), which can be compactly stored and easily tested for ray intersection. If a ray intersects against the bounding box of the geometry, then the underlying geometry is then tested as well. If a ray does not intersect against the bounding box of the geometry though, then that underlying geometry does not need to be tested. As FIGS. 1A-1C show, a hierarchy of AABB's is created to increase the culling effect of a single AABB bounding box test. This allows for efficient traversal and a quick reduction to the geometry of interest.

As explained above, a bounding volume is often used to approximate the space an object occupies. If a more precise understanding beyond an approximation is required, the object itself is then inspected to determine what space it occupies. Often, a simple volume (such as an axis-aligned box) is used as bounding volume to approximate the space occupied by an object. But objects can have arbitrary, complicated shapes. So a simple volume often does not fit the object very well. Hence, although AABB's are widely and conventionally used for ray tracing, not all geometry can be tightly fit to a single, axis-aligned box. That causes a lot of space that is not occupied by the object to be included in the approximation of the space being occupied by the object. When geometry does not fit well, there can be false hits that lead to extra work. The example non-limiting technology has the advantage of providing single hit behavior for better fitting bounding volumes than current ray tracing acceleration hardware. Previous solutions had potentially more false positives, repeated geometry, repeated tests, and excess traversal costs. A multi-box solution supported by a wide compressed treelet format representation helps eliminate that inefficiency.

Eventually the underlying geometry is not intersected, and no hit is returned, but having to do those tests is inefficient compared to being able to cull the work at a higher processing level. There are at least three problematic cases:

1. Triangles, likely long, skinny, and unaligned, that result in dead space within the bounding volume.
2. Non-triangle geometry, like hair and curves, which do not fit well.
3. Geometry hidden under an instance transform.

In the triangle case, state of the art builders can split misbehaving triangles across multiple boxes. Typically, the triangle itself is not broken up, but instead is duplicated in the triangle buffer and included under multiple boxes. In this case, the intersection for a triangle can potentially occur outside of its bounding box and can potentially be tested against multiple times, but in all cases only one intersection is returned. See e.g., Karras, Fast Parallel Construction of High-Quality Bounding Volume Hierarchies, NVIDIA (2013); U.S. Pat. No. 10,331,632; Ganestem et al, "SAH guided spatial split partitioning for fast BVH construction", Eurographics Volume 35 (2016), Number 2 (2016); Havran V., et al, "On Improving KD-Trees for Ray Shooting", In Winter School on Computer Graphics pp. 209-217 (2002); Garanzha et al, "Grid-based SAH BVH construction on a GPU, The Visual Computer, Vol. 27, Issue 6-8, pp. 697-706 (June 2011). In particular, triangle splitting without using the example non-limiting technology herein can result in the same triangle/primitive being returned multiple times. This isn't useful in practice and can hurt performance, but it isn't necessarily harmful (aside from the performance impact) so long as the traversal algorithm on the processor side can handle it. Note that there is a mode select in the DirectX (DXR) specification that allows for queries to have multiple returns of the same triangle/primitive. If that mode select instead says only one intersection is allowed, then triangle splitting must be disabled. One would do that if they were using an algorithm for which multiple returns would be too complicated to handle. Reference info on the DXR "D3D12_RAYTRACING_GEOMETRY_FLAG_NO_DUPLICATE_ANYHIT_INVOCATION" that can be found at https://microsoft.github.io/DirectX-Specs/d3d/Raytracing.html#d3d12_raytracing_geometry_flags:

"By default, the system is free to trigger on any hit shader more than once for a given ray-primitive intersection. This flexibility helps improve the traversal efficiency of acceleration structures in certain cases. For instance, if the acceleration structure is implemented internally with bounding volumes, the implementation may find it beneficial to store relatively long triangles in multiple hounding boxes rather than a larger single box.

However, some application use cases require that intersections be reported to the any hit shader at most once. This flag enables that guarantee for the given geometry, potentially with some performance impact.

This flag applies to all geometry types."

Example implementations herein allow a builder to use triangle splitting while ignoring that flag.

In the non-triangle geometry case, procedural or complex geometry like hair and curves can use a separate intersection test(s) not accelerated by the ray tracing acceleration hardware. This type of test typically requires interruption of the traversal to return to a controlling or other specialized process (e.g., software running on a streaming or other multiprocessor) for a complex and expensive (e.g., software based) geometry-ray intersection test. The performance impact of interrupting hardware based traversal and in doing the complex test is high. To reduce the impact, hair is often broken into smaller segments that are more linear to better fit within a single box. Still, alignment issues can cause this to be inefficient. For example, in the past, such smaller segments were treated as separate objects so that a ray along the curve could positively test for bounding volume intersections multiple times, requiring multiple expensive ray-geometry intersection tests.

A third case is when instance transforms are used. A typical acceleration structure comprises both a Top-Level Acceleration Structure ("TLAS") and multiple Bottom-Level Acceleration Structures ("BLAS"). In typical known implementations, the TLAS is in world space, while the BLASes use object space. The alignment then for a single object can be more tightly fit in its own object space. The object is then placed in a common world space via a transform. The same BLAS can be used multiple times underneath a TLAS to represent multiple instances of that geometry. For example, a set of chairs in a room where all chairs are identical can be represented by a single BLAS. The grouping of geometry in this way can be efficient for construction but can lead to inefficiency in traversal since the BLAS typically must be represented by a single AABB. For example, a four-legged chair bound by a single box would have dead space between legs as well as above the seat in front of the chair back. That dead space can lead to false hits of the instance in the TLAS—leading to extra transforms done into that object space only to miss at the BLAS level. Improvements can in some instances be realized by rotating the single AABB to provide a better fit, but this does not work well for all geometry.

Given the great potential of a truly interactive real time ray tracing graphics processing system for rendering high quality images of arbitrary complexity in response for example to user input, further work is possible and desirable. In particular, it would be highly desirable to increase ray tracing efficiency and improve performance for geometric primitives of arbitrary complexity.

BRIEF DESCRIPTION OF THE DRAWINGS

FIGS. 2A-2C, 2B1 and 2C1 illustrate example geometry that can be more tightly fit using multiple bounding volumes.

FIGS. 4A-4C illustrates a simple stick figure enclosed by multiple bounding volumes in a bottom-level acceleration structure that can be hoisted into a top-level acceleration structure for better culling before transform.

FIGS. 5A, 5B illustrates an internal node bundling multiple curves into one multi-box with each curve broken out separately in a child complet at a lower layer.

FIG. 8 shows example wide complet layout formats.

FIG. 16 shows an example comparator network layout.

FIG. 17 shows example pseudo-code for functions at the beginning of top level traversal.

DETAILED DESCRIPTION OF NON-LIMITING EMBODIMENTS

Figure 1A:
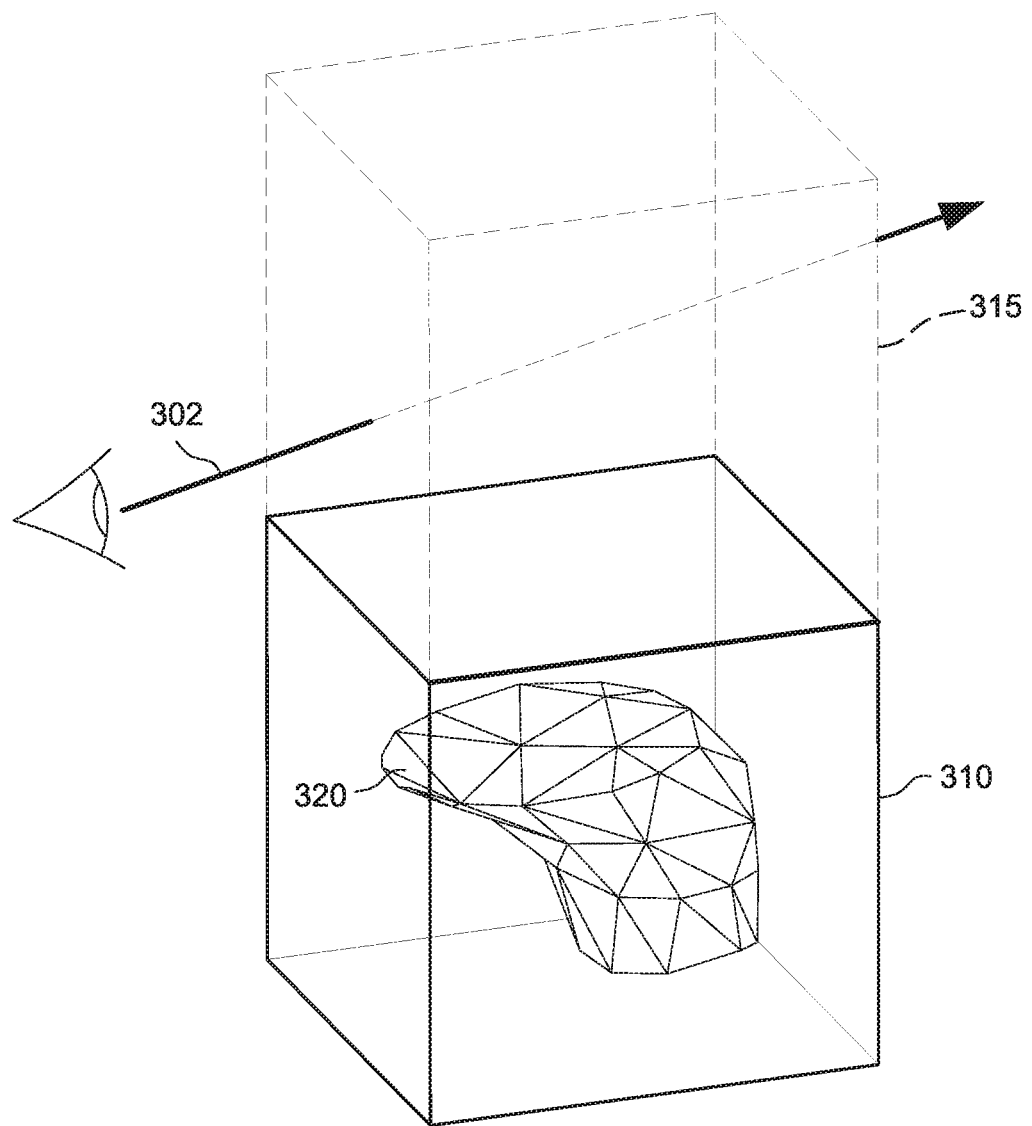
FIGS. 1A-1C show example simplified ray tracing tests to determine whether the ray passes through a bounding volume containing geometry and whether the ray intersects geometry within the bounding volume.

The technology herein thus provides hardware-based capabilities that efficiently accelerate ray tracing for such non-fitting geometry. Hardware-based technique are disclosed herein, for example, for efficiently using multiple bounding volumes (such as axis-aligned bounding boxes) to represent, in effect, an arbitrarily shaped bounding volume to better fit the object, and for using such arbitrary bounding volumes to improve performance in applications such as ray tracing. In one embodiment, multiple bounding volumes constructed around an object are treated as a single bounding volume for purposes of ray-volume intersection testing. Multiple positive ray-volume intersection results based on testing such multiple bounding volumes are distilled down into a single ray intersection indication (another way of looking at it: if the ray hits any of the multiple bounding volumes, it hits all of them since the multiple bounding volumes are known to contain the same extended geometric primitive). This can result in substantial performance increases for certain objects and scenes that previously required expensive multiple ray-object intersection tests.

In one example non-limiting embodiment, an AABB acceleration structure is constructed using compressed treelets ("complets") that are wide, allowing multiple (e.g., up to 12 in some embodiments) bounding volume children to be tested simultaneously. The technology herein introduces a multi-box complet format that allows a single child to have multiple bounding volumes (e.g., AABBs) associated with it where a "hit" (positive result of a ray-bounding volume intersection test) on any positive number (one or more) of those bounding volumes is treated as a single "hit" or intersection for that child. In other words, the traditional ray-bounding volume intersection test is in appropriate cases (i.e., cases where bounding the geometry doesn't fit the AABB bounding volumes well) explicated to test (e.g., in parallel within a single cycle in some embodiments) a plurality of bounding volumes (all of which can be AABBs) instead of a single bounding volume. Those plurality of AABB bounding volumes are positioned, sized and oriented to more closely enclose such geometry than any single AABB could. The plurality of bounding volumes can have the same sizes and/or shapes and/or orientation or different sizes and/or shapes and/or orientations. They can be connected, overlapping or disjoint. This allows approximating non-box like shapes or otherwise non-axis-oriented shapes with AABBs that result in a better fitting bounding volume than a single AABB would.

Furthermore, in some embodiments, the geometry intersection testing in the event of a hit between the ray and one of the explicated plurality of bounding volumes can proceed in the same way as if a single AABB had been used and found to intersect the ray. Increased efficiency results from a potential decrease in the number of hits between a set of rays and the explicated plurality of bounding volumes (AABBs) as compared to number of hits between that set of rays and a single, larger AABB. Performance does not suffer, especially in example embodiments that essentially or actually test all of the explicated plurality of bounding volumes in parallel so the amount of time needed to perform ray-bounding volume intersection tests for all of the explicated plurality of bounding volumes is on the same order as the amount of time to test a single, larger AABB. Furthermore, in some example embodiments, an "early out" algorithm could eliminate the need to test further multi-boxes for an object once an intersection is found with one of the multi-boxes.

Figure 1B:
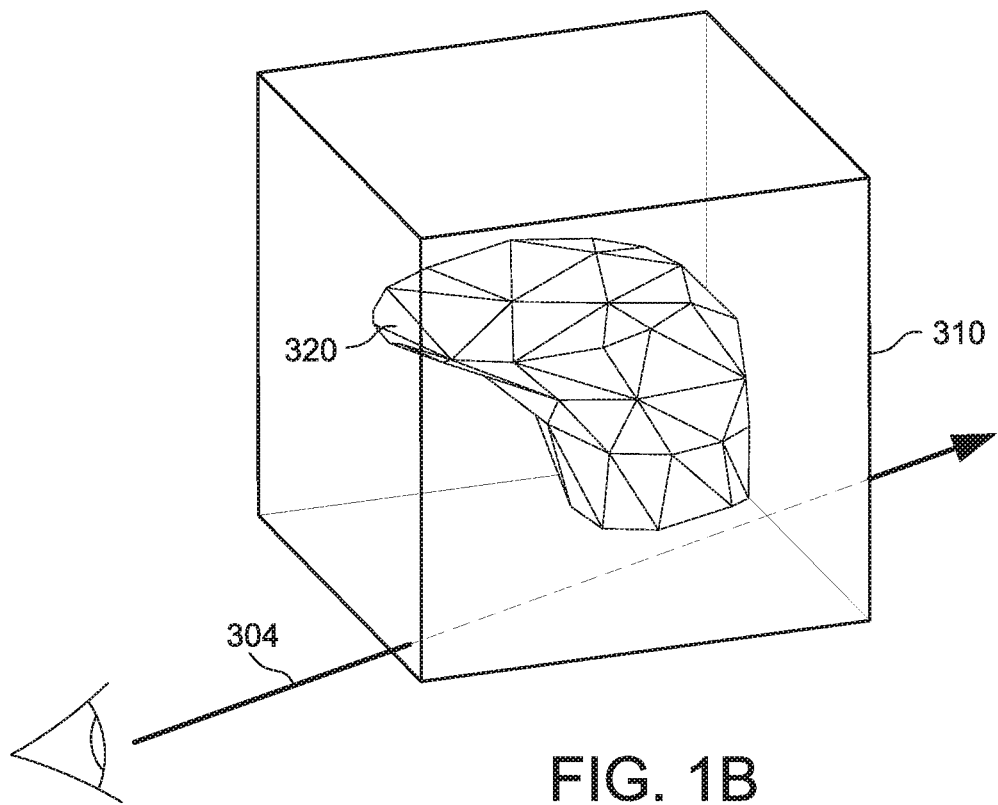
Figure 1C:
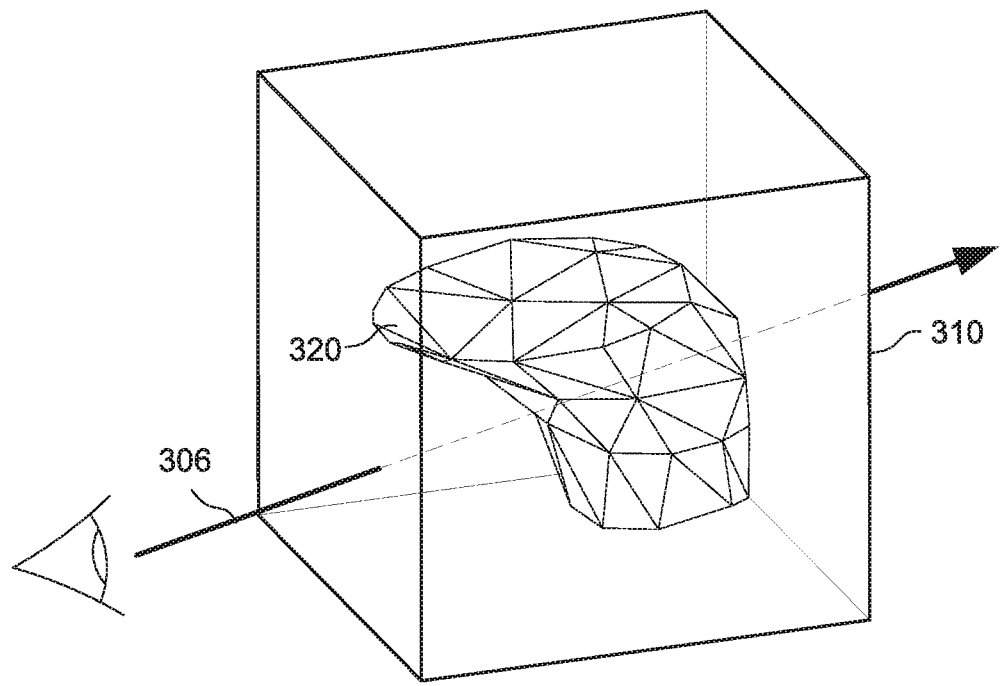

By way of further illustration, FIGS. 2A, 2B and 2C show examples of geometry that does not fit well into a single AABB. FIG. 2A shows a cylinder, FIG. 2B shows a curved object, and FIG. 2C shows a triangle. These Figures show two-dimensional views, but the actual geometry and bounding volumes in modern ray tracing systems will be three-dimensional. FIGS. 2B1 and 2C1 show 3D views of the FIGS. 2B and 2C scenarios, respectively.

In these examples:
  The cylinder of FIG. 2A would fit closely within a single AABB if the cylinder were vertically or horizontally aligned, but is a bad fit for any AABB because the cylinder's orientation is at an angle with respect to the axes.
  The curved object of FIGS. 2B/2B1 is shaped such that different portions have different orientations and no single AABB that encloses the object will provide a close fit.
  The triangle shown in FIG. 2C/2C1 is not aligned with one of the axes, and its shape and dimensions are such that any AABB will also enclose lots of space the triangle does not occupy.

In each case, an original AABB bounding box represented by the dotted lines can be used to encompass the geometry but would also encompass large amounts of empty space. As FIGS. 2A-2C, 2B1, 2C1 show, in each case the particular geometry can be more tightly fit with multiple (e.g., 4) smaller boxes represented by the solid-line boxes. In the FIG. 2A configuration, all of the smaller boxes are the same size and orientation and are just placed at different positions. In the FIG. 2B/2B1 configuration and the FIG. 2C/2C1 configuration, the smaller boxes are of different sizes and orientations.

In some cases such as FIGS. 2A and 2C, the smaller boxes overlap one another; in other cases, the do not overlap. There is no substantial penalty to such overlapping for purposes of a ray intersection test since in example embodiments, any number of intersections with individual smaller bounding volumes will be resolved to a single ray-bounding volume intersection "hit" that will lead to testing the ray against the enclosed geometry. But FIG. 2B shows that the smaller bounding volumes need not overlap, and in some cases (e.g., if the geometry has a void or gap, is defined as particles of a particular system e.g., to define smoke, fog, etc.), it may be desirable for the bounding volumes to be disjoint.

In example embodiments, the number of bounding boxes in a set is programmatic and controlled per complet. It could consist of any number, but for ease of implementation one example non-limiting embodiment chooses the even divisions of the complet width: 2, 3, 4, 6, and 12 boxes per child. In the case of 2 boxes per child, each complet that can represent 12 boxes would have 6 children. For 3 boxes per child, each complet that can represent 12 boxes would have 4 children. And so on, up to 12 boxes per child representing just a single child in that complet. Different numbers of child bounding volumes can be used depending on the particular geometry and the particular implementation.

Figure 3A:
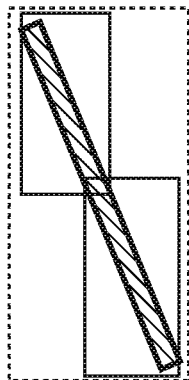
FIGS. 3A-3E illustrates how a single object can be encapsulated by multiple bounding volumes of varying count.
Figure 3B:
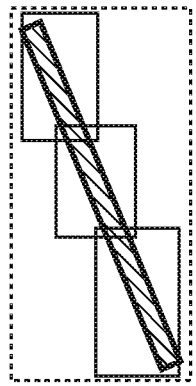
Figure 3C:
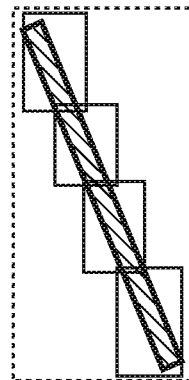
Figure 3D:
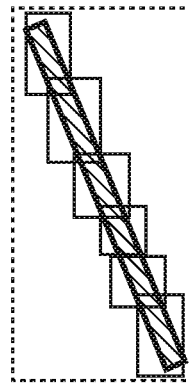
Figure 3E:
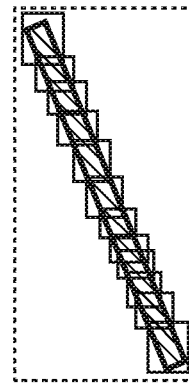

FIGS. 3A-3E show how the same object (in this case the cylinder of FIG. 2A) can be encapsulated by multiple boxes of varying count, where again the solid boxes represent the constituent boxes of the multi-box set of an explicated plurality of bounding volumes while the dotted box represents what would have been the singular bounding box. FIG. 3C is essentially the same scenario as FIG. 2A. However, FIGS. 3A and 3B show use of fewer (e.g., 2 or 3) AABBs to bound the cylinder, and FIGS. 3D and 3E show use of more (e.g., 6 or 12) AABBs. It can be seen that for long thin non-aligned objects, closer fits (and thus smaller numbers of false ray intersection hits) can be attained by using more bounding volumes.

For long, skinny, unaligned triangles, the multi-box solution looks very much like conventional triangle splitting in that the same triangle is included under (within) multiple boxes. But unlike most conventional triangle splitting approaches, the multi-box scenario shown in FIGS. 3A-3E as implemented by example non-limiting embodiments herein does not require duplicating the primitive. Specifically, it is conventional to use multiple bounding volumes instead of one large bounding volume to more closely fit such triangles, but in such cases designers do not split the triangle into multiple parts because this can result in holes in the geometry and introduce artifacts in the resulting images. Accordingly, prior approaches duplicated the triangle for each smaller bounding volume, which could result in multiple ray-geometry intersection tests on each copy of the triangle in the case of rays for example that are aligned with the long axis of the triangle. Furthermore, duplicating the triangle as in prior approaches required the same triangle to be stored multiple times, resulting in increased memory usage. In example non-limiting approaches of multi-box, in contrast, the triangle will (need) not be stored more than once or tested more than once against the ray in a ray-triangle intersection test, realizing increased efficiency.

For hair and curves such as in FIG. 2B/2B1, the multi-box solution allows for a better fitting volume reducing the false positives that can result in a traversal interruption and costly return to the streaming multiprocessor or other controlling software process. A triangle splitting like solution could also be applied to curves, but it results in multiple returns of the same underlying object to the controlling process. The multi-box solution herein allows for just a single return for encapsulated shapes of arbitrary complexity.

Instance Transforms

In many modern ray tracing systems, objects replicated several or many times in the scene at different positions, orientations and scales can be represented in the scene as instance nodes. These instance nodes associate a bounding box and leaf node in the world space BVH with a transformation that can be applied to the world-space ray to transform it into an object coordinate space, and a pointer to an object-space BVH. Instance transforms avoid replicating the object space BVH data multiple times in world space, saving memory and associated memory accesses. The instance transform increases efficiency by transforming the ray into object space instead of requiring the geometry or the bounding volume hierarchy to be transformed into world (ray) space and is also compatible with additional, conventional rasterization processes that graphics processing performs to visualize the primitives.

In such instance transform cases, multi-box can also be used for instance "hoisting" from a lower level of the acceleration structure to a higher level of the acceleration structure. For example, the bounding boxes in a BLAS may be "hoisted" into the TLAS for better culling before the transform.

FIG. 4A shows a simple stick figure covered by 6 boxes in a BLAS in object or instance space. Without multi-box in FIG. 4B, the TLAS (in world space) would treat the 6 boxes as a single box (dashes). With example non-limiting implementations of multi-box, we can essentially pull or hoist those 6 children defined in object space up into the TLAS of the acceleration data structure as a 6-box multi-box child (solid lines in FIG. 4C) in world space—which should have fewer false hits requiring the traversal process to descend into the instance, thereby avoiding unnecessary transforms just to test rays against what amounts to dead space. Because the multi-box intersection testing can now be performed using multi-box on the TLAS level in world space, the transform of the ray to object space by the TTU can be avoided for purposes of the multi-box/ray intersection test. Furthermore, the multi-boxes offer the additional advantage that they can more tightly fit the geometry in world space than a conventional (e.g., dotted line) single AABB bounding box can. There isn't a rotation here, but one could imagine the figure as rotated so those top-level boxes in FIG. 4C don't have the same orientations as the root in the BLAS shown in FIG. 4A. If the multi-boxes on the TLAS level are sufficiently reliable, then there is no need to use the same multi-boxes at the root of the BLAS level—although the multi-box technique can be used on the BLAS level for other intersection testing (e.g., to test for intersection with curves defining hair on the head of the stick figure shown). This is what FIGS. 4A-4C show.

Furthermore, it is possible for the multi-boxes on the TLAS level of FIG. 5B to be defined in ways other than by a builder transforming the FIG. 5A multi-boxes from object space to world space. For example, to construct the FIG. 5B multi-boxes, the builder could transform the underlying geometry to world space and then construct TLAS world space multi-boxes to more tightly fit the transformed geometry.

Internal Nodes

In example embodiments, the multi-box complet format is not reserved just for leaf nodes but can also be used for internal nodes. That is effectively agglomerating multiple primitives or boxes into one bundle. FIG. 5A shows an internal node bundling multiple curves into one multi-box child. If an intersection test against the multi-box structure shown in FIG. 5A reveals an intersection between a ray and any of the multi-boxes, a downward traversal of the BVH to a leaf node can provide additional multi-boxes—and in this case a different set of multi-boxes for each different primitive bounded by the FIG. 5A multi-boxes. Thus, FIG. 5B shows each curve broken out separately in a child complet at a lower layer of the BVH, with a different set of AABB bounding boxes being used to bound each different curve or other primitive for purposes of ray-complet intersection testing. In this example, note that the bounding boxes of FIG. 5B are not further subdivisions of the FIG. 5A bounding boxes. The FIG. 5B boxes are often fully contained within the FIG. 5A bounding boxes while being further reduced in dimensions to more tightly fit associated primitives, but they do not need to be. For example, boxes on different layers can have different precisions so that boxes on upper layers can be smaller than boxes on the lower layer. Because an upper layer ray intersection test will fail if the ray does not intersect a smaller upper layer box, no traversal performance degradation results by making lower layer boxes larger than upper layer boxes. Rather, in some embodiments, the ray-complet intersection test performed on a leaf node is a Boolean union with previously-performed intersection tests on upper layer bounding boxes for the same geometry because the traversal will not proceed downward to a leaf node if a test performed on an upper layer does not show intersection.

The following provides more detail on how to construct BVH acceleration structures that supports/provides multi-box and can be encoded using wide complet formats. Following that, an overall hardware based real time graphics processing system including real time ray tracing hardware that can traverse and manipulate such acceleration structures is disclosed.

Building a Bounding Volume Hierarchy

As described above, an acceleration data structure comprises a hierarchy of bounding volumes (bounding volume hierarchy or BVH) that recursively encapsulates smaller and smaller bounding volume subdivisions. The largest volumetric bounding volume may be termed a "root node." The smallest subdivisions of such hierarchy of bounding volumes ("leaf nodes") contain items. The items could be primitives (e.g., polygons such as triangles) that define surfaces of the object. Or, an item could be a sphere that contains a whole new level of the world that exists as an item because it has not been added to the BVH (think of the collar charm on the cat from "Men in Black" which contained an entire miniature galaxy inside of it). If the item comprises primitives, the traversal co-processor upon reaching an intersecting leaf node tests rays against the primitives associated with the leaf node to determine which object surfaces the rays intersect and which object surfaces are visible along the ray.

Building a BVH can occur in two parts: static and dynamic. In many applications, a complex scene is preprocessed and the BVH is created based on static geometry of the scene. Then, using interactive graphics generation including dynamically created and manipulated moving objects, another part of the BVH (or an additional, linked BVH(es) can be built in real time (e.g., in each frame) by driver or other software running on the real time interactive graphics system. BVH construction need not be hardware accelerated (although it may be in some non-limiting embodiments) but may implemented using highly-optimized software routines running on SMs 132 and/or CPU 120 and/or other development systems e.g., during development of an application.

Figure 6:
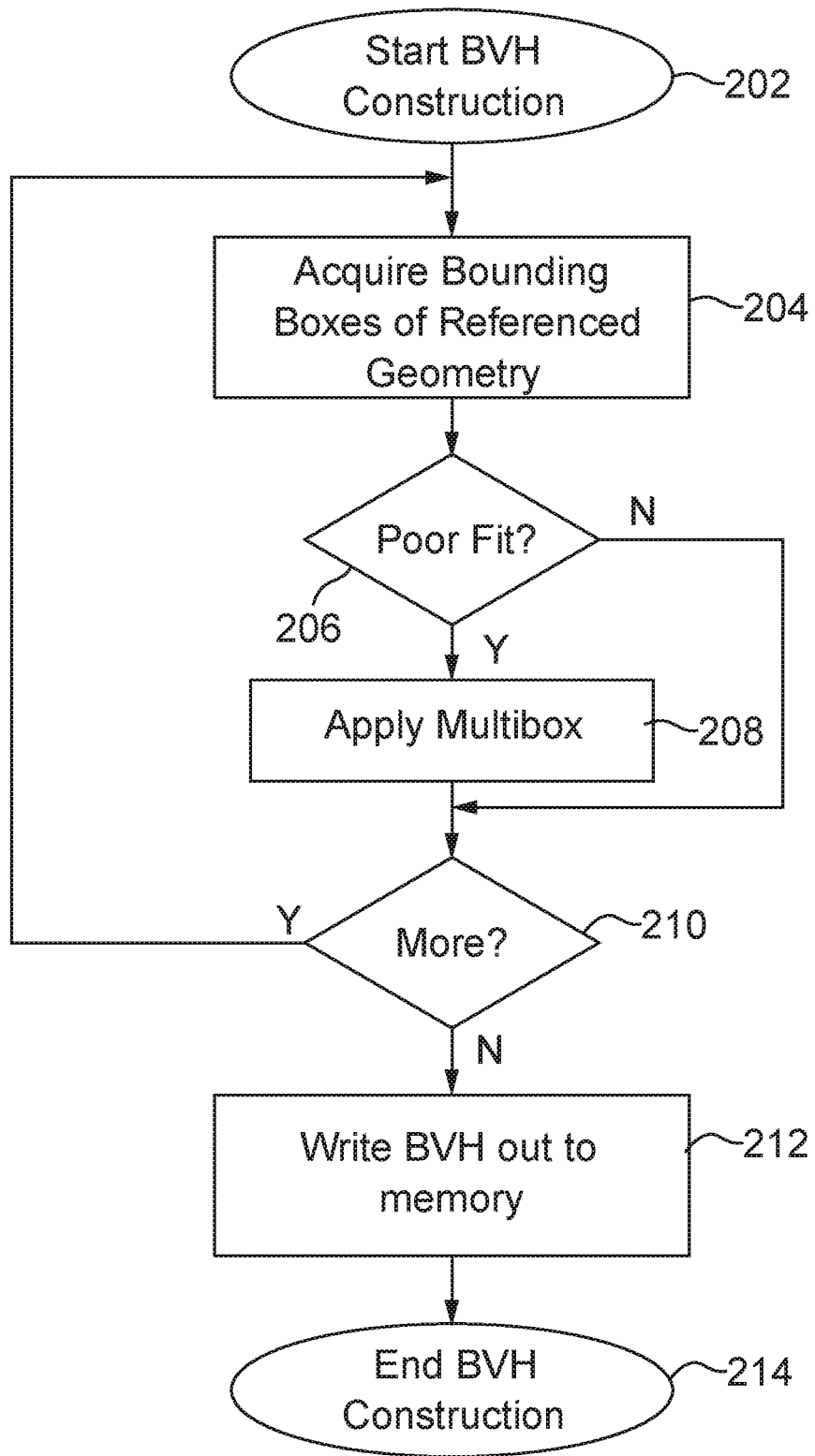
FIG. 6 is a flowchart of an example non-limiting acceleration structure build process.

The first stage in BVH acceleration structure construction acquires the bounding boxes of the referenced geometry (FIG. 6, 204). This is achieved by executing for each geometric primitive in an object a bounding box procedure that returns a conservative axis-aligned bounding box (AABB) for its input primitive. Aligning bounding boxes with the axes of the relevant coordinate systems for the geometry provides for increased efficiency of real time geometrical operations such as intersection testing and coordinate transforms as compared for example to oriented bounding boxes (OBB's), bounding spheres, or other approaches. However, those skilled in the art will understand that the example non-limiting multi-box approaches and associated wide complet representations described herein can also be applied to more expensive bounding constructs such as OBBs, bounding spheres and other bounding volume technology. On the other hand, depending on the shape of the underlying geometry, an aggregation of plural AABBs using the multi-box approach described herein may provide improvements over both conventional AABB technology and other bounding technology such as OBBs.

The standard procedure will typically yield the dotted line bounding boxes of FIGS. 2A, 2B, 2C. Already subdivided bounding volumes that do include at least one portion of the geometry in a scene can be still further recursively subdivided—like the emergence of each of a succession of littler and littler cats from the hats of Dr. Seuss's' The Cat In The Hat Comes Back (1958). The number and configurations of recursive subdivisions will depend on the complexity and configuration of the 3D object being modeled as well as other factors such as desired resolution, distance of the object from the viewpoint, etc. One example subdivision scheme is a so-called 8-ary subdivision or "octree" in which each volume is subdivided into eight smaller volumes of uniform size, but many other spatial hierarchies and subdivision schemes are known such as a binary tree, a four-ary tree, a k-d tree, a binary space partitioning (BSP) tree, and a bounding volume hierarchy (BVH) tree. See e.g., U.S. Pat. No. 9,582,607.

At some level of subdivision (which can be different levels for different parts of the BVH), the BVH construction process encounters geometry making up the encapsulated object being modeled. Using the analogy of a tree, the successive volumetric subdivisions are the trunk, branches, boughs and twigs, and the geometric is finally revealed at the very tips of the tree, namely the leaves. At this point, the BVH construction process for example non-limiting embodiments herein performs an optimization at this stage to spot, using heuristic or other analytical techniques (which might include artificial intelligence and/or neural networks in some embodiments), those leaf nodes that (like the FIG. 2A/2B/2C scenarios) present poor fits with respect to the geometry they contain (FIG. 6, 206). These poor-fitting nodes can be optimized by applying multi-box as explained above, providing more efficient AABBs—essentially collections of overlapping or non-overlapping AABBs that create new bounding volume shapes that more tightly enclose geometry than a standard conservatively-constructed AABB can (and without requiring the additional complexity needed to support non-axis aligned bounding volumes such as OBBs) (FIG. 6, 208).

This process continues until all bounding volumes containing geometry have been sufficiently subdivided to provide a reasonable number of geometric primitives per bounding box (FIG. 6, 210). In example non-limiting embodiments, multi-boxes are not further subdivided (even if applied to interior or non-leaf nodes). The real time ray tracer that uses the BVH will determine ray-primitive intersections by comparing the spatial xyz coordinates of the vertices of each primitive with the xyz coordinates of the ray to determine whether the ray and the surface the primitive defines occupy the same space. The ray-primitive intersection test can be computationally intensive because there may be many triangles to test. In many cases, it may be more efficient to further volumetrically subdivide and thereby limit the number of primitives in any "leaf node" to something like 16 or fewer.

The resulting compressed tree comprising compressed treelets is written out into a data structure in memory for later use by the graphics processing hardware/software during e.g., real time graphics processing that includes real time ray tracing (FIG. 6, 212).

Figure 7A:
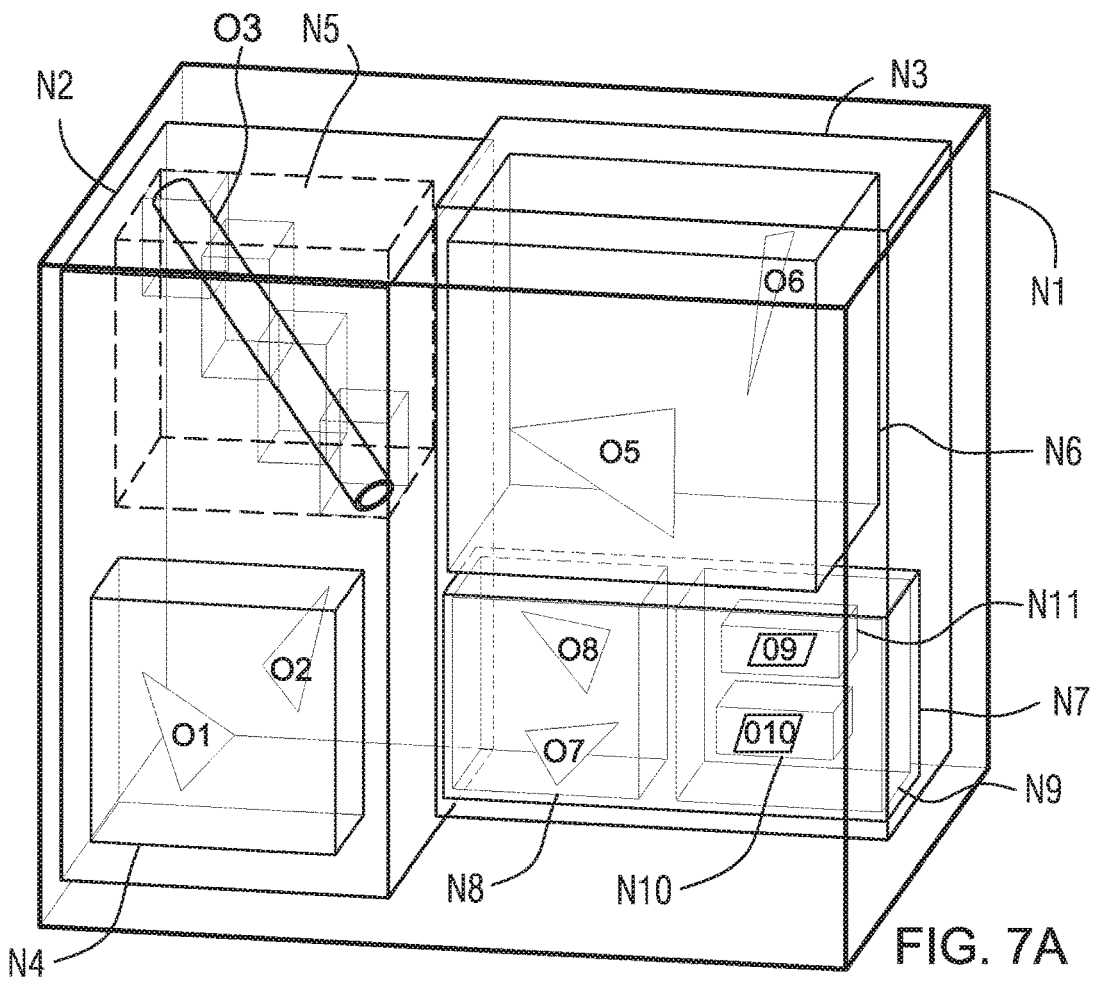
FIGS. 7A and 7B show example bounding volume hierarchy representations.
Figure 7B:
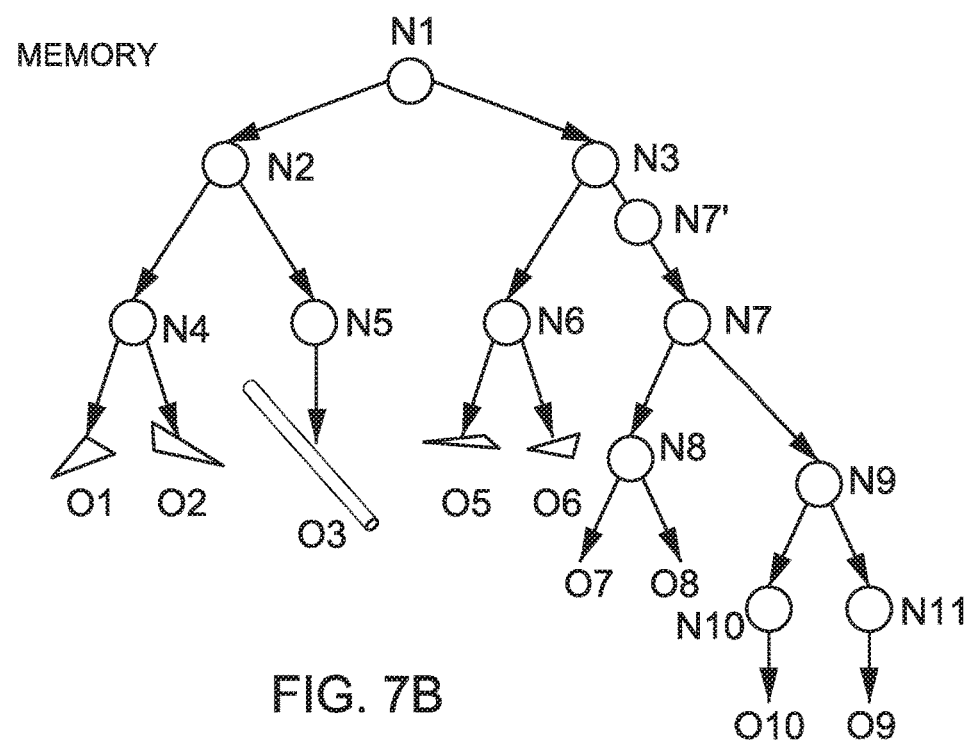

FIGS. 7A and 7B show a recursively-subdivided bounding volume of a 3D scene (FIG. 7A) and a corresponding tree data structure (FIG. 7B) that may be accessed by the ray tracer and used for hardware-accelerated operations. The tree data structure may be stored in memory and retrieved on demand based on queries.

The division of the bounding volumes may be represented in a hierarchical tree data structure with the large bounding volume represented by a parent node of the tree and the smaller bounding volumes represented by children nodes of the tree that are contained by the parent node. The smallest bounding volumes are represented as leaf nodes in the tree and identify one or more geometric primitives contained within these smallest bounding volumes.

The tree data structure includes a plurality of nodes arranged in a hierarchy. The root nodes N1 of the tree structure correspond to bounding volume N1 enclosing all of the primitives O1-O8. The root node N1 may identify the vertices of the bounding volume N1 and children nodes of the root node.

In FIG. 7A, bounding volume N1 is subdivided into bounding volumes N2 and N3. Children nodes N2 and N3 of the tree structure of FIG. 7B correspond to and represent the bounding volumes N2 and N3 shown in FIG. 7A. The children nodes N2 and N3 in the tree data structure identify the vertices of respective bounding volumes N2 and N3 in space. Each of the bounding volumes N2 and N3 is further subdivided in this particular example. Bounding volume N2 is subdivided into contained bounding volumes N4 and N5. Bounding volume N3 is subdivided into contained bounding volumes N6 and N7. Bounding volume N7 include two bounding volumes N8 and N9. Bounding volume N8 includes the triangles O7 and O8, and bounding volume N9 includes leaf bounding volumes N10 and N11 as its child bounding volumes. Leaf bounding volume N10 includes a primitive range (e.g., triangle range) O10 and leaf bounding volume N11 includes an item range O9. Respective children nodes N4, N5, N6, N8, N10 and N11 of the FIG. 7B tree structure correspond to and represent the FIG. 7A bounding volumes N4, N5, N6, N8, N10 and N11 in space.

The FIG. 7B tree in this particular example is only three to six levels deep so that volumes N4, N5, N6, N8, N10 and N11 constitute "leaf nodes"—that is, nodes in the tree that have no child nodes. FIG. 7A shows that leaf node bounding volumes N4, N6, and N8 each contains two triangles of the geometry in the scene. For example, volumetric subdivision N4 contains triangles O1 & O2; volumetric subdivision N6 contains trials O5 & O6; and volumetric subdivision N8 contains triangles O7 & O8. FIG. 7A further shows that leaf node bounding volume N5 contains a single cylinder O3 such as shown in FIG. 2A that does not provide a good fit for the AABB bounding volume N5 shown in dotted lines. Accordingly, in an example non-limiting embodiment herein, instead of using the larger AABB bounding volume N5 for the ray-bounding volume intersection test, TTU 138 instead tests the ray against a plurality of smaller AABB bounding volumes that are arranged, positioned, dimensioned and oriented to more closely fit cylinder O3.

The tree structure shown in FIG. 7B represents these leaf nodes N4, N5, N6, and N7 by associating them with the appropriate ones of primitive O1-O8 of the scene geometry. To access this scene geometry, the TTU 138 traverses the tree data structure of FIG. 7B down to the leaf nodes. In general, different parts of the tree can and will have different depths and contain different numbers of primitives. Leaf nodes associated with volumetric subdivisions that contain no geometry need not be explicitly represented in the tree data structure (i.e., the tree is "trimmed").

According to some embodiments, the subtree rooted at N7 may represent a set of bounding volumes or BVH that is defined in a different coordinate space than the bounding volumes corresponding to nodes N1-N3. When bounding volume N7 is in a different coordinate space from its parent bounding volume N3, an instance node N7' which provides the ray transformation necessary to traverse the subtree rooted at N7, may connect the rest of the tree to the subtree rooted at N7. Instance node N7' connects the bounding volume or BVH corresponding to nodes N1-N3, with the bounding volumes or BVH corresponding to nodes N7 etc. by defining the transformation from the coordinate space of N1-N3 (e.g., world space) to the coordinate space of N7 etc. (e.g., object space). As described herein, example embodiments herein can "hoist" multi-boxes from the (object) coordinate space of N7 to the (world) coordinate space of N1-N3 in order to in some cases avoid the need for performing such transforms.

In example embodiments, the complet formatting performed by the process to write out BVH nodes is extended to include new, wider formats that specify the boxes per child. Sets are made of contiguous children. FIG. 8 shows example layout formats for multi-box. In one embodiment, these layout formats are sized the same way as legacy formats to fit within a single cache line. In other implementations, the complet formats could have variable instead of fixed lengths to accommodate more entries for those nodes that use multi-box. Furthermore, while compression is used to reduce the size of the acceleration structure in example embodiments, other embodiments might not use compression or the same type of compression.

An example legacy format would provide one box each for child 0-child 11. As FIG. 8 shows, for complets with 2 boxes per node, a 2-box multi-box format would use what was child 0 and child 1 before (in a legacy format) as child 0 and then its extension child 0 box 1. Similarly, child 2 would be provided with an extension child 2 box 1, and so on. The complets meanwhile can contain the same additional information used in legacy complet formats. Using this new multi-box format, the same data block that in legacy scenarios could represent 12 child bounding volumes can now only represent 6 child bounding volumes—half as many. Accordingly, in example embodiments, children 1, 3, 5, 7, 9 and 11 are omitted from this format to make room for the extension child boxes. Those omitted children can be represented in a similar multi-box format each with their own extension boxes, or they can be represented without multi-box if multibox is not needed for the geometry they contain.

For complets with 3 boxes per node, the node corresponding to child 0 is represented as child 0, child 0 box 1, and child 0 box 2. Similarly, the node corresponding to child 3 is represented as child 3, child 3 box 1, and child 3 box 2. Four-box complets represent each child with four boxes, six-box complets represent each child with six boxes, and twelve-box complets represent each child with twelve boxes. In the example embodiment, a 12-box complet such as shown in FIG. 3E would take up the entire data block space such that the format would be used only representing the 12 multi-boxes of the same child node (0).

In example embodiments, all multi-boxes represented in one block can be tested in parallel, although this is not a limitation. Other multibox formats can be provided with some unused fields within the confines of a single cache line sized block (i.e., embodiments can have numbers of child nodes that are not divisors of 12.) It is also possible to have a multi-box format where different children are defined to have different numbers of extension boxes. In terms of selecting which of the FIG. 8 formats to use in a particular situation, parallel testing of each box in the format means that processing performance will not be reduced by using fewer rather than more boxes per child, but memory bandwidth can be conserved if a smaller number of multiboxes are used for a given primitive consistent with desired accuracy (see FIGS. 3A-3E).

In one example non-limiting embodiment, a multi-box child represented by the FIG. 8 formats is valid or invalid based solely on the primary child fields having an inverted zlo/zhi as in the legacy TTU behavior for non-multi-box complets.

The FIG. 8 formats show header information including a field that indicates the multi-box count and field that contain inheritance (ancestor/descendant) pointers into the BVH;

pointers to each "child" volume including references to multiple boxes per child; and extended header information.

Example Real Time Ray Tracing Hardware Accelerated Implementation

The acceleration structure constructed as described above can be used to advantage by software based graphics pipeline processes running on a conventional general purpose computer. However, the presently disclosed non-limiting embodiments advantageously implement the above-described techniques in the context of a hardware-based graphics processing unit including a high performance processors such as one or more streaming multiprocessors ("SMs") and one or more traversal co-processors or "tree traversal units" (("TTUs")—subunits of one or a group of streaming multiprocessor SMs of a 3D graphics processing pipeline, that is capable of providing wide complet intersection tests on multi-box bounding volumes as described herein. The following describes the overall structure and operation of such as system including a TTU 138 that accelerates certain processes supporting interactive ray tracing including ray-bounding volume intersection tests, ray-primitive intersection tests and ray "instance" transforms for real time ray tracing and other applications. Such TTU has been enhanced to support wide complets and multi-box ray-volume intersection testing as describe above.

Example System Block Diagram

Figure 9:
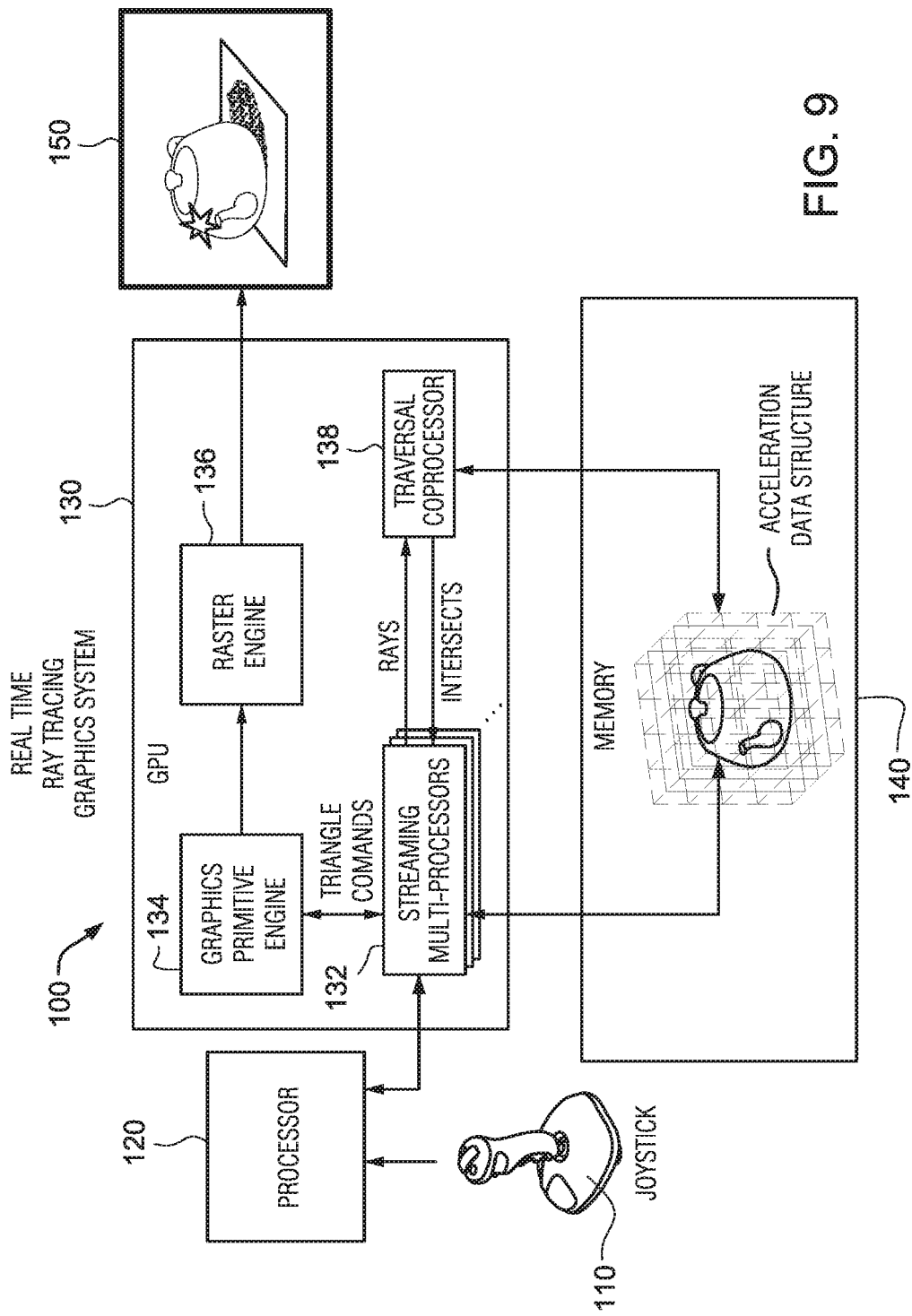
FIG. 9 illustrates an example non-limiting ray tracing graphics system.

FIG. 9 illustrates an example real time ray interactive tracing graphics system 100 for generating images using three dimensional (3D) data of a scene or object(s) including the acceleration data structure constructed as described above.

System 100 includes an input device 110, a processor(s) 120, a graphics processing unit(s) (GPU(s)) 130, memory 140, and a display(s) 150. The system shown in FIG. 9 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 120 may be a multicore central processing unit (CPU) operable to execute an application in real time interactive response to input device 110, the output of which includes images for display on display 150. Display 150 may be any kind of display such as a stationary display, a head mounted display such as display glasses or goggles, other types of wearable displays, a handheld display, a vehicle mounted display, etc. For example, the processor 120 may execute an application based on inputs received from the input device 110 (e.g., a joystick, an inertial sensor, an ambient light sensor, etc.) and instruct the GPU 130 to generate images showing application progress for display on the display 150.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Based on execution of the application on processor 120, the processor may issue instructions for the GPU 130 to generate images using 3D data stored in memory 140. The GPU 130 includes specialized hardware for accelerating the generation of images in real time. For example, the GPU 130 is able to process information for thousands or millions of graphics primitives (polygons) in real time due to the GPU's ability to perform repetitive and highly-parallel specialized computing tasks such as polygon scan conversion much faster than conventional software-driven CPUs. For example, unlike the processor 120, which may have multiple cores with lots of cache memory that can handle a few software threads at a time, the GPU 130 may include hundreds or thousands of processing cores or "streaming multiprocessors" (SMs) 132 running in parallel.

In one example embodiment, the GPU 130 includes a plurality of programmable high performance processors that can be referred to as "streaming multiprocessors" ("SMs") 132, and a hardware-based graphics pipeline including a graphics primitive engine 134 and a raster engine 136. These components of the GPU 130 are configured to perform real-time image rendering using a technique called "scan conversion rasterization" to display three-dimensional scenes on a two-dimensional display 150. In rasterization, geometric building blocks (e.g., points, lines, triangles, quads, meshes, etc.) of a 3D scene are mapped to pixels of the display (often via a frame buffer memory).

The GPU 130 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 150 for display. Many software and hardware advances over the years have improved subjective image quality using rasterization techniques at frame rates needed for real-time graphics (i.e., 30 to 60 frames per second) at high display resolutions such as 4090×2160 pixels or more on one or multiple displays 150.

To enable the GPU 130 to perform ray tracing in real time in an efficient manner, the GPU provides one or more "TTUs" 138 coupled to one or more SMs 132. The TTU 138 includes hardware components configured to perform (or accelerate) operations commonly utilized in ray tracing algorithms. A goal of the TTU 138 is to accelerate operations used in ray tracing to such an extent that it brings the power of ray tracing to real-time graphics application (e.g., games), enabling high-quality shadows, reflections, and global illumination. Results produced by the TTU 138 may be used together with or as an alternative to other graphics related operations performed in the GPU 130.

More specifically, SMs 132 and the TTU 138 may cooperate to cast rays into a 3D model and determine whether and where that ray intersects the model's geometry. Ray tracing directly simulates light traveling through a virtual environment or scene. The results of the ray intersections together with surface texture, viewing direction, and/or lighting conditions are used to determine pixel color values. Ray tracing performed by SMs 132 working with TTU 138 allows for computer-generated images to capture shadows, reflections, and refractions in ways that can be indistinguishable from photographs or video of the real world. Since ray tracing techniques are even more computationally intensive than rasterization due in part to the large number of rays that need to be traced, the TTU 138 is capable of accelerating in hardware certain of the more computationally-intensive aspects of that process.

Given a BVH constructed as described above, the TTU 138 performs a tree search where each node in the tree visited by the ray has a bounding volume for each descendent branch or leaf, and the ray only visits the descendent branches or leaves whose corresponding bound volume it intersects. In this way, TTU 138 explicitly tests only a small number of primitives for intersection, namely those that reside in leaf nodes intersected by the ray. In the example non-limiting embodiments, the TTU 138 accelerates both tree traversal (including the ray-volume tests) and ray-primitive tests. As part of traversal, it can also handle at least one level of instance transforms, transforming a ray from world-space coordinates into the coordinate system of an instanced mesh. In the example non-limiting embodiments, the TTU 138 does all of this in MIMD fashion, meaning that rays are handled independently once inside the TTU.

In the example non-limiting embodiments, the TTU 138 operates as a servant (coprocessor) to the SMs (streaming multiprocessors) 132. In other words, the TTU 138 in example non-limiting embodiments does not operate independently, but instead follows the commands of the SMs 132 to perform certain computationally-intensive ray tracing related tasks much more efficiently than the SMs 132 could perform themselves. In other embodiments or architectures, the TTU 138 could have more or less autonomy.

In the examples shown, the TTU 138 receives commands via SM 132 instructions and writes results back to an SM register file. For many common use cases (e.g., opaque triangles with at most one level of instancing), the TTU 138 can service the ray tracing query without further interaction with the SM 132. More complicated queries (e.g., involving alpha-tested triangles, primitives other than triangles, or multiple levels of instancing) may require multiple round trips (although the technology herein reduces the need for such "round trips" for certain kinds of geometry by providing the TTU 138 with enhanced capabilities to autonomously perform multi-box ray-bounding-volume intersection testing without the need to ask the calling SM for help). In addition to tracing rays, the TTU 138 is capable of performing more general spatial queries where an AABB or the extruded volume between two AABBs (which we call a "beam") takes the place of the ray. Thus, while the TTU 138 is especially adapted to accelerate ray tracing related tasks, it can also be used to perform tasks other than ray tracing.

The TTU 138 thus autonomously performs a test of each ray against a wide range of bounding volumes, and can cull any bounding volumes that don't intersect with that ray. Starting at a root node that bounds everything in the scene, the traversal co-processor tests each ray against smaller (potentially overlapping) child bounding volumes which in turn bound the descendent branches of the BVH. The ray follows the child pointers for the bounding volumes the ray hits to other nodes until the leaves or terminal nodes (volumes) of the BVH are reached. As described herein, any such bounding volume can be explicated as a plurality of bounding boxes to provide a more efficient intersection test for certain geometry e.g., that cannot be convenient enclosed by axis-aligned-bounding boxes (AABBs).

Once the TTU 138 traverses the acceleration data structure to reach a terminal or "leaf" node (which may be represented by one or multiple bounding volumes) that intersects the ray and contains a geometric primitive, it performs an accelerated ray-primitive intersection test to determine whether the ray intersects that primitive (and thus the object surface that primitive defines). The ray-primitive test can provide additional information about primitives the ray intersects that can be used to determine the material properties of the surface required for shading and visualization. Recursive traversal through the acceleration data structure enables the traversal co-processor to discover all object primitives the ray intersects, or the closest (from the perspective of the viewpoint) primitive the ray intersects (which in some cases is the only primitive that is visible from the viewpoint along the ray). See e.g., Lefrancois et al, NVIDIA Vulkan Ray Tracing Tutorial, December 2019, https://developer.nvidia.com/rtx/rdytracing/vkray As mentioned above, the TTU 138 also accelerates the transform of each ray from world space into object space to obtain finer and finer bounding box encapsulations of the primitives and reduce the duplication of those primitives across the scene. As described above, objects replicated many times in the scene at different positions, orientations and scales can be represented in the scene as instance nodes which associate a bounding box and leaf node in the world space BVH with a transformation that can be applied to the world-space ray to transform it into an object coordinate space, and a pointer to an object-space BVH. This avoids replicating the object space BVH data multiple times in world space, saving memory and associated memory accesses. The instance transform increases efficiency by transforming the ray into object space instead of requiring the geometry or the bounding volume hierarchy to be transformed into world (ray) space and is also compatible with additional, conventional rasterization processes that graphics processing performs to visualize the primitives. However, as explained above in connection with FIGS. 4A-4C, technology herein reduces the need for such efficient transforms to further increase performance.

Example Ray Tracing Processes

Figure 10:
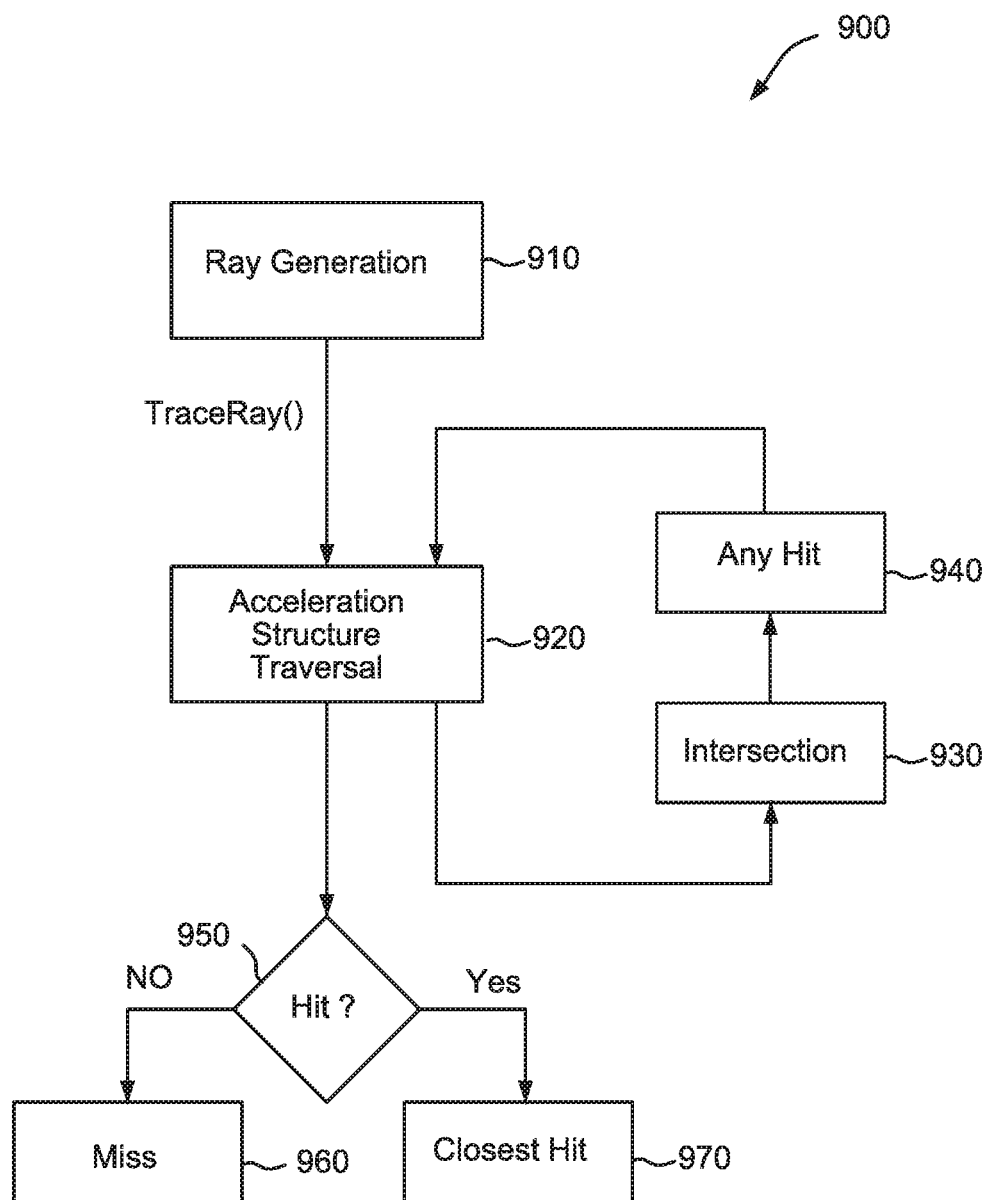
FIG. 10 is a flowchart of an example non-limiting ray tracing graphics pipeline.

FIG. 10 shows an exemplary ray tracing shading pipeline 900 that may be performed by SM 132 and accelerated by TTU 138. The ray tracing shading pipeline 900 starts by an SM 132 invoking ray generation 910 and issuing a corresponding ray tracing request to the TTU 138. The ray tracing request identifies a single ray cast into the scene and asks the TTU 138 to search for intersections with an acceleration data structure the SM 132 also specifies. The TTU 138 traverses (FIG. 10 block 920) the acceleration data structure to determine intersections or potential intersections between the ray and the volumetric subdivisions and associated triangles the acceleration data structure represents. Potential intersections can be identified by finding bounding volumes in the acceleration data structure that are intersected by the ray. Descendants of non-intersected bounding volumes need not be examined.

For triangles within intersected bounding volumes, the TTU 138 ray-primitive test block 720 performs an intersection 930 process to determine whether the ray intersects the primitives. The TTU 138 returns intersection information to the SM 132, which may perform an "any hit" shading operation 940 in response to the intersection determination. For example, the SM 132 may perform (or have other hardware perform) a texture lookup for an intersected primitive and decide based on the appropriate texel's value how to shade a pixel visualizing the ray. The SM 132 keeps track of such results since the TTU 138 may return multiple intersections with different geometry in the scene in arbitrary order.

Figure 11:
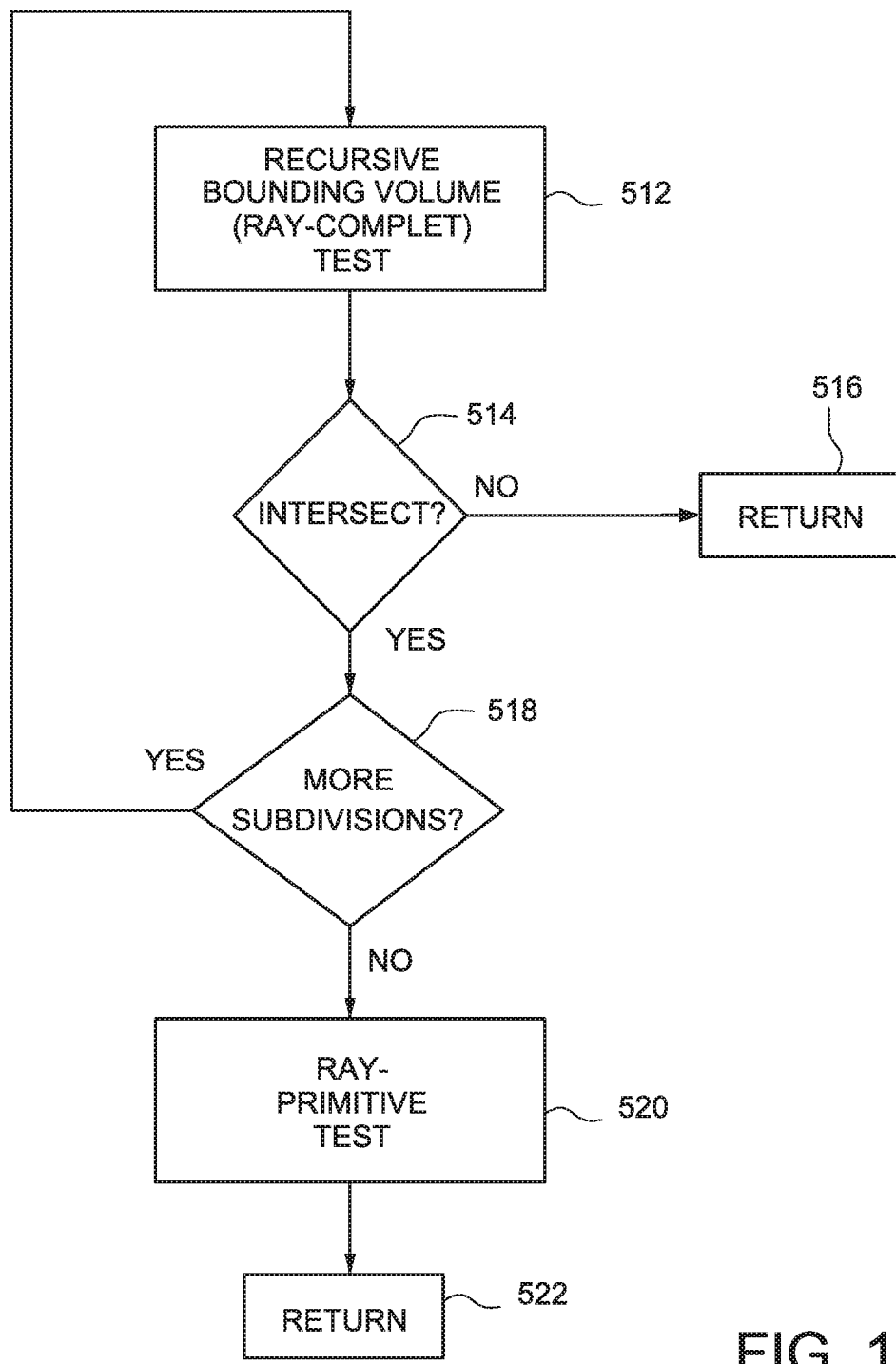
FIG. 11 is a flowchart of example non-limiting hardware based ray tracing operations.

FIG. 11 is a flowchart summarizing example ray tracing operations the TTU 138 performs as described above in cooperation with SM(s) 132. The FIG. 11 operations are performed by TTU 138 in cooperation with its interaction with an SM 132. The TTU 138 may thus receive the identification of a ray from the SM 132 and traversal state enumerating one or more nodes in one or more BVH's that the ray must traverse. The TTU 138 determines which bounding volumes of a BVH data structure the ray intersects (the "ray-complet" test 512). The TTU 138 can also subsequently determine whether the ray intersects one or more primitives in the intersected bounding volumes and which triangles are intersected (the "ray-primitive test" 520)—or the SM 132 can perform this test in software if it is too complicated for the TTU to perform itself. In example non-limiting embodiments, complets specify root or interior nodes (i.e., volumes) of the bounding volume hierarchy with children that are other complets or leaf nodes of a single type per complet.

First, the TTU 138 inspects the traversal state of the ray. If a stack the TTU 138 maintains for the ray is empty, then traversal is complete. If there is an entry on the top of the stack, the traversal co-processor 138 issues a request to the memory subsystem to retrieve that node. The traversal co-processor 138 then performs a bounding box test 512 to determine if a bounding volume of a BVH data structure is intersected by a particular ray the SM 132 specifies (step 512, 514). In example non-limiting embodiments herein, this bounding box test 512 is modified to include a plurality of intersection tests, one or each of a plurality of multi-boxes uses in combo to conservative enclose the geometric primitive(s). If the bounding box test determines that the bounding volume is not intersected by the ray ("No" in step 514), then there is no need to perform any further testing for visualization and the TTU 138 can return this result to the requesting SM 132. This is because if a ray misses a bounding volume (as in FIG. 1A with respect to bounding volume 310), then the ray will miss all other smaller bounding volumes inside the bounding volume being tested and any primitives that bounding volume contains.

If the bounding box test performed by the TTU 138 reveals that the bounding volume is intersected by the ray ("Yes" in Step 514), then the TTU determines if the bounding volume can be subdivided into smaller bounding volumes (step 518). In one example embodiment, the TTU 138 isn't necessarily performing any subdivision itself. Rather, each node in the BVH has one or more children (where each child is a leaf or a branch in the BVH). For each child, there is one or more bounding volumes and a pointer that leads to a branch or a leaf node. When a ray processes a node using TTU 138, it is testing itself against the bounding volumes of the node's children. The ray only pushes stack entries onto its stack for those branches or leaves whose representative bounding volumes were hit. When a ray fetches a node in the example embodiment, it doesn't test against the bounding volume of the node—it tests against the bounding volumes of the node's children. The TTU 138 pushes nodes whose bounding volumes are hit by a ray onto the ray's traversal stack in an order determined by ray configuration. For example, it is possible to push nodes onto the traversal stack in the order the nodes appear in memory, or in the order that they appear along the length of the ray, or in some other order. If there are further subdivisions of the bounding volume ("Yes" in step 518), then those further subdivisions of the bounding volume are accessed and the bounding box test is performed for each of the resulting subdivided bounding volumes to determine which subdivided bounding volumes are intersected by the ray and which are not. In this recursive process, some of the bounding volumes may be eliminated by test 514 while other bounding volumes may result in still further and further subdivisions being tested for intersection by TTU 138 recursively applying steps 512-518.

Once the TTU 138 determines that the bounding volumes intersected by the ray are leaf nodes ("No" in step 518), the TTU 138 and/or SM 132 performs a primitive (e.g., triangle) intersection test 520 to determine whether the ray intersects primitives in the intersected bounding volumes and which primitives the ray intersects. The TTU 138 thus performs a depth-first traversal of intersected descendent branch nodes until leaf nodes are reached. The TTU 138 processes the leaf nodes. If the leaf nodes are primitive ranges, the TTU 138 or the SM 132 tests them against the ray. If the leaf nodes are instance nodes, the TTU 138 or the SM 132 applies the instance transform. If the leaf nodes are item ranges, the TTU 138 returns them to the requesting SM 132. In the example non-limiting embodiments, the SM 132 can command the TTU 138 to perform different kinds of ray-primitive intersection tests and report different results depending on the operations coming from an application (or an software stack the application is running on) and relayed by the SM to the TTU. For example, the SM 132 can command the TTU 138 to report the nearest visible primitive revealed by the intersection test, or to report all primitives the ray intersects irrespective of whether they are the nearest visible primitive. The SM 132 can use these different results for different kinds of visualization. Or the SM 132 can perform the ray-primitive intersection test itself once the TTU 138 has reported the ray-complet test results. Once the TTU 138 is done processing the leaf nodes, there may be other branch nodes (pushed earlier onto the ray's stack) to test.

Example Non-Limiting TTU 138 Hardware Implementation

Figure 12:
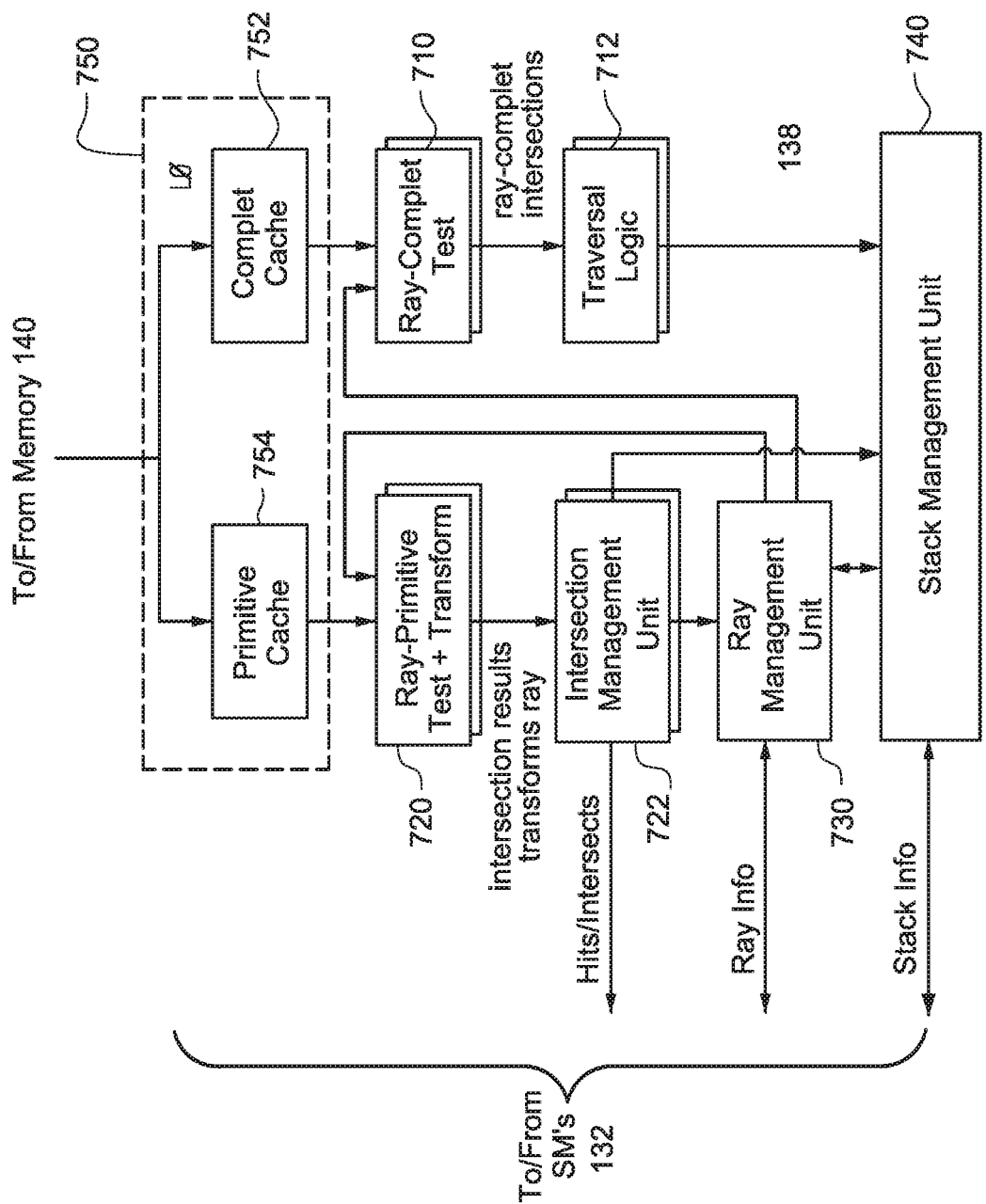
FIG. 12 shows a simplified example non-limiting traversal co-processor comprising a tree traversal unit (TTU).
Figure 13:
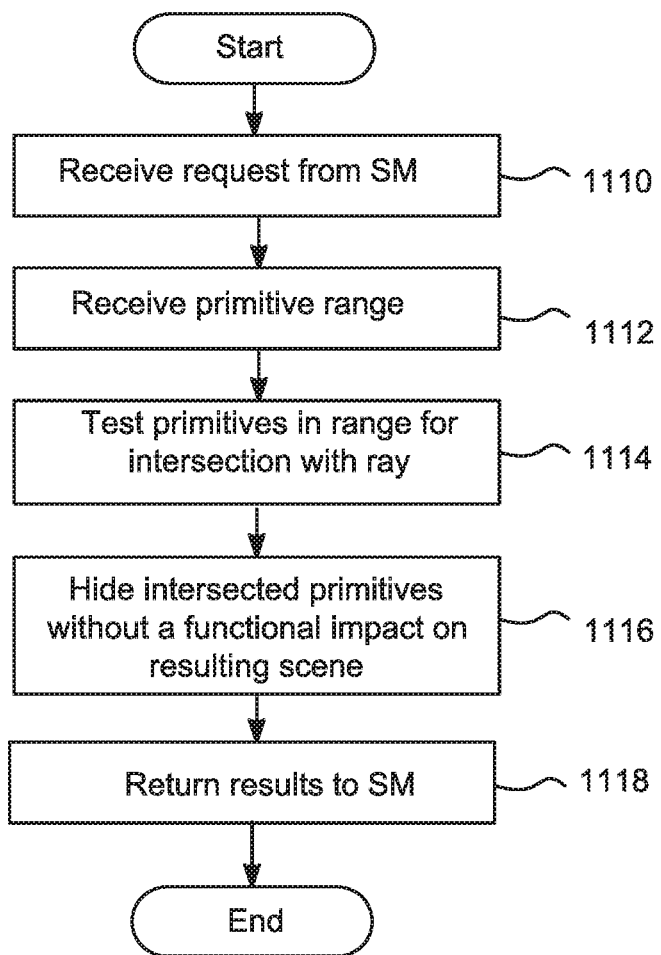
FIGS. 13 and 14 are flowcharts of example TTU processing.

FIG. 12 shows an example simplified block diagram of TTU 138 including hardware configured to perform accelerated traversal operations as described above. In some embodiments, the TTU 138 may perform a depth-first traversal of a bounding volume hierarchy using a short stack traversal with intersection testing of supported leaf node primitives and mid-traversal return of alpha primitives and unsupported leaf node primitives (items). The TTU 138 includes dedicated hardware to determine whether a ray intersects bounding volumes and dedicated hardware to determine whether a ray intersects primitives of the tree data structure.

In more detail, TTU 138 includes an intersection management block 722, a ray management block 730 and a stack management block 740. Each of these blocks (and all of the other blocks in FIG. 12) may constitute dedicated hardware implemented by logic gates, registers, hardware-embedded lookup tables or other combinatorial logic, etc.

The ray management block 730 is responsible for managing information about and performing operations concerning a ray specified by an SM 132 to the ray management block. The stack management block 740 works in conjunction with traversal logic 712 to manage information about and perform operations related to traversal of a BVH acceleration data structure. Traversal logic 712 is directed by results of a ray-complet test block 710 that tests intersections between the ray indicated by the ray management block 730 and volumetric subdivisions represented by the BVH, using instance transforms as needed. The ray-complet test block 710 retrieves additional information concerning the BVH from memory 140 via an L0 complet cache 752 that is part of the TTU 138. The results of the ray-complet test block 710 informs the traversal logic 712 as to whether further recursive traversals are needed. The stack management block 740 maintains stacks to keep track of state information as the traversal logic 712 traverses from one level of the BVH to another, with the stack management block 740 pushing items onto the stack as the traversal logic traverses deeper into the BVH and popping items from the stack as the traversal logic traverses upwards in the BVH. The stack management block 740 is able to provide state information (e.g., intermediate or final results) to the requesting SM 132 at any time the SM requests.

The intersection management block 722 manages information about and performs operations concerning intersections between rays and primitives, using instance transforms as needed. The ray-primitive test block 720 retrieves information concerning geometry from memory 140 on an as-needed basis via an L0 primitive cache 754 that is part of TTU 138. The intersection management block 722 is informed by results of intersection tests the ray-primitive test and transform block 720 performs. Thus, the ray-primitive test and transform block 720 provides intersection results to the intersection management block 722, which reports geometry hits and intersections to the requesting SM 132.

A Stack Management Unit 740 inspects the traversal state to determine what type of data needs to be retrieved and which data path (complet or primitive) will consume it. The intersections for the bounding volumes are determined in the ray-complet test path of the TTU 138 including one or more ray-complet test blocks 710 and one or more traversal logic blocks 712. A complet specifies root or interior nodes of a bounding volume. Thus, a complet may define one or more bounding volumes for the ray-complet test. In example embodiments herein, a complet may define a plurality of "child" bounding volumes that (whether or not they represent leaf nodes) that don't necessarily each have descendants but which the TTU will test in parallel for ray-bounding volume intersection to determine whether geometric primitives associated with the plurality of bounding volumes need to be tested for intersection.

The ray-complet test path of the TTU 138 identifies which bounding volumes are intersected by the ray. Bounding volumes intersected by the ray need to be further processed to determine if the primitives associated with the intersected bounding volumes are intersected. The intersections for the primitives are determined in the ray-primitive test path including one or more ray-primitive test and transform blocks 720 and one or more intersection management blocks 722.

The TTU 138 receives queries from one or more SMs 132 to perform tree traversal operations. The query may request whether a ray intersects bounding volumes and/or primitives in a BVH data structure. The query may identify a ray (e.g., origin, direction, and length of the ray) and a BVH data structure and traversal state (short stack) which includes one or more entries referencing nodes in one or more Bounding Volume Hierarchies that the ray is to visit. The query may also include information for how the ray is to handle specific types of intersections during traversal. The ray information may be stored in the ray management block 730. The stored ray information (e.g., ray length) may be updated based on the results of the ray-primitive test.

The TTU 138 may request the BVH data structure identified in the query to be retrieved from memory outside of the TTU 138. Retrieved portions of the BVH data structure may be cached in the level-zero (L0) cache 750 within the TTU 138 so the information is available for other time-coherent TTU operations, thereby reducing memory 140 accesses. Portions of the BVH data structure needed for the ray-complet test may be stored in a L0 complet cache 752 and portions of the BVH data structure needed for the ray-primitive test may be stored in an L0 primitive cache 754.

After the complet information needed for a requested traversal step is available in the complet cache 752, the ray-complet test block 710 determines bounding volumes intersected by the ray. In performing this test, the ray may be transformed from the coordinate space of the bounding volume hierarchy to a coordinate space defined relative to a complet. The ray is tested against the bounding boxes associated with the child nodes of the complet. In the example non-limiting embodiment, the ray is not tested against the complet's own bounding box because (1) the TTU 138 previously tested the ray against a similar bounding box when it tested the parent bounding box child that referenced this complet, and (2) a purpose of the complet bounding box is to define a local coordinate system within which the child bounding boxes can be expressed in compressed form. If the ray intersects any of the child bounding boxes, the results are pushed to the traversal logic to determine the order that the corresponding child pointers will be pushed onto the traversal stack (further testing will likely require the traversal logic 712 to traverse down to the next level of the BVH). These steps are repeated recursively until intersected leaf nodes of the BVH are encountered The ray-complet test block 710 may provide ray-complet intersections to the traversal logic 712. Using the results of the ray-complet test, the traversal logic 712 creates stack entries to be pushed to the stack management block 740. The stack entries may indicate internal nodes (i.e., a node that includes one or more child nodes) that need to be further tested for ray intersections by the ray-complet test block 710 and/or triangles identified in an intersected leaf node that need to be tested for ray intersections by the ray-primitive test and transform block 720. The ray-complet test block 710 may repeat the traversal on internal nodes identified in the stack to determine all leaf nodes in the BVH that the ray intersects. The precise tests the ray-complet test block 710 performs will in the example non-limiting embodiment be determined by mode bits, ray operations (see below) and culling of hits, and the TTU 138 may return intermediate as well as final results to the SM 132.

Multi-Box Implementation

Figure 14:
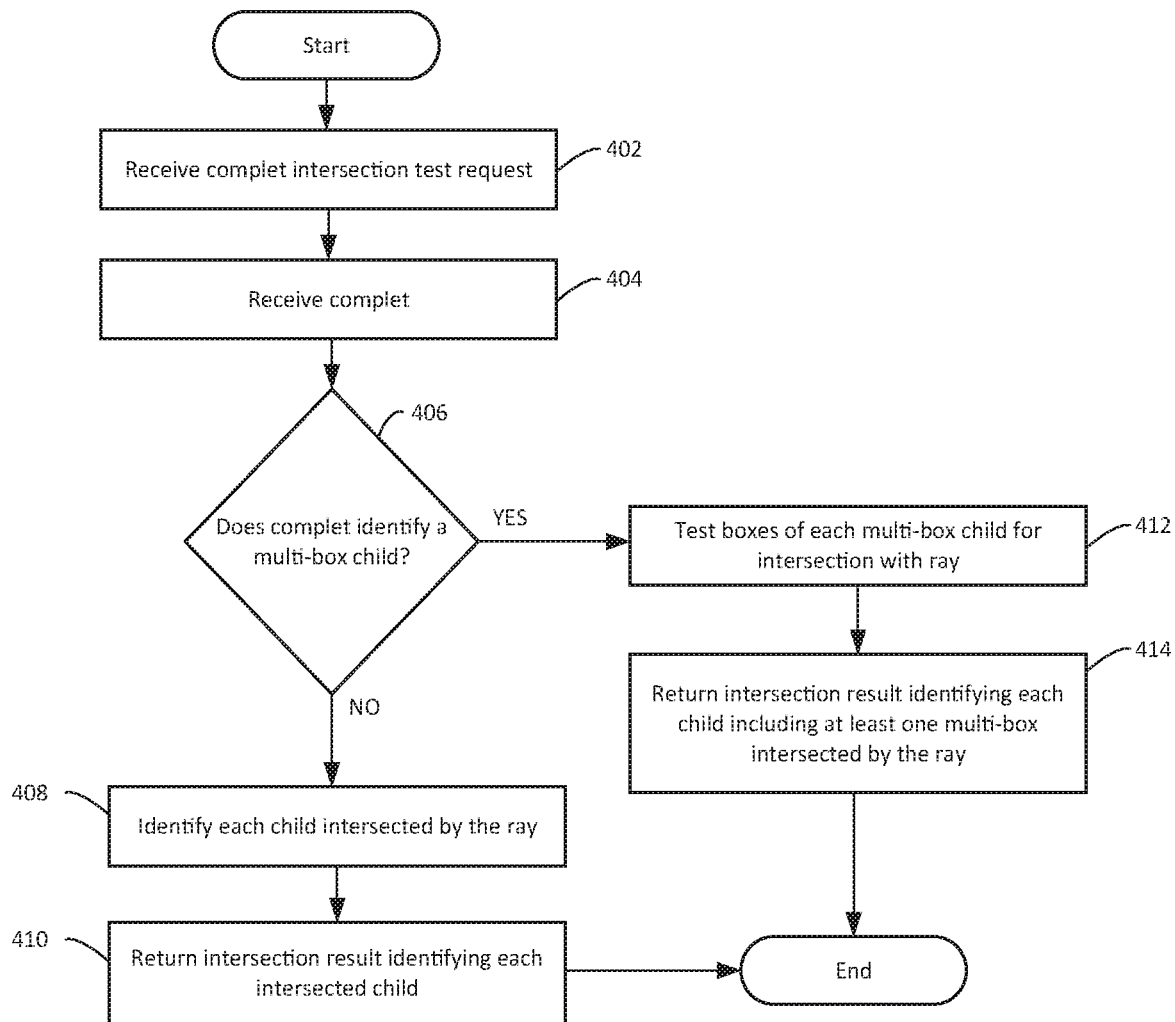

FIG. 14 is a flowchart of an example non-limiting method for accelerated ray-bounding volume intersection test performed by TTU 138 using multibox techniques. The method may be performed by a TTU 138 (e.g., ray-complet test unit 710 and traversal logic 712 of the TTU 138) disclosed in this application, but is not so limited.

The method includes receiving a request for a complet intersection test 402. The complet intersection test may include identifying intersections between a query data structure (e.g., a ray) and one or more child nodes (each identified by one or more bounding volumes) identified in a complet 402. The request may be received from an SM or may be based on previous results of ray-complet test performed by the ray-complet test path of the TTU. In some embodiments, the query data structure may be a ray given by its three-coordinate origin, three-coordinate direction, and/or minimum and maximum values for the t-parameter along the ray. The complet may be identified by location of complet in memory or pointer to node of a BVH structure, which may be an inner node or a leaf node.

In response to the request, the complet is retrieved from memory 404. The complet may be retrieved from the TTU memory (e.g., complet cache 752 of L0 cache 750) or memory outside of the TTU. The complet may for example be provided as a single cacheline-sized block (e.g., 128B) or in a contiguous group of cacheline-sized blocks. The cacheline-sized block may include header information and bounding volume information. See FIG. 8 for example formats of a complet. Each cacheline-sized block may include a predetermined number of sub-blocks, each sub-block corresponding to a child node of the current node.

The header information of the block may include type of geometry within the block, node type information (e.g., inner node or leaf node), number of child nodes in the block, number of bodes in each child node, and/or one or more override flags for controlling how ray determined to intersect a bounding volume is treated (e.g., with or without culling the ray). See FIG. 8.

The child node information may identify one or more bounding volumes for each child node represented by the block. In the typical case there will be a single AABB box for each child node, but in a multi-box case there will be more than one AABB box for each child node represented by the block. Accordingly, a child may be associated with a single bounding volume (e.g., a box) identified in the child node information or a plurality of bounding volumes (e.g., sub-box or sub-volume). For example, each child node may be identified with two sub-boxes, three sub-boxes, or twelve sub-boxes. In some examples, the child node information may include each child node including the same number of sub-boxes. In other examples, the child node information may include child nodes identified with a mixed number of boxes. In one example, one or more child nodes may be identified with a single bounding volume (e.g., a box) and one or more other child nodes may be identified with a plurality of boxes. However, in the FIG. 11 example formats, all child nodes are associated with the same number of bounding volumes (e.g., 1, 2, 3, 4, 6 or 12).

The method includes determining if the complet identifies a multi-box child 406. The determination may be made based on a flag set in the header of the complet and/or for each child identified in the complet.

When the determination is made that the complet does not identify a multi-box child (No in step 406), the method includes determining whether the single bounding volume associated with each child in the complet is intersected by the ray 408. This ray-complet intersection test may determine whether the ray intersects an area identified by the child's bounding volume (e.g., defined by vertices of a box in object-space coordinates). To test the ray against the area identified by the child's bounding volume, the ray may be transformed into the object-space coordinates of the bounding volume using instance transforms.

The method includes returning an intersection result identifying each child bounding volume that was intersected by the ray 410. The results may be returned to the SM, the traversal logic 712 and/or the stack management unit 740 for performing further tests in the ray-primitive test path and/or the ray-complet test path of the TTU based on the results. The intersection results may include ray intersection position. For example, the intersection results may include a t-min value for the ray indicating a position along the ray where the ray intersects the child's bounding volume. The respective ray intersection position may be provided for each child determined to be intersected by the ray.

When the determination is made that the complet includes a multi-box child (YES in step 406), the method includes testing all of plural bounding volumes associated with the ray to determine whether any are intersected by ray 412. Similar to step 408, identifying boxes associated with the child that are intersected by the ray may include determining whether the ray intersects an area identified by the bounding volumes of any of the multi-boxes (e.g., by vertices of a box in object-space coordinates). To test the ray against the areas identified by the multi-boxes, the ray may be transformed into the object-space coordinates of the bounding volumes using instance transforms.

The method includes returning intersection results identifying each child multi-box intersected by the ray 414. Operations 412 and 414 may report each (sub)bounding volume determined to be intersected by the ray to the transversal logic 712, which may in turn OR together all such intersection results for all multiboxes of a child to determine a single Boolean True/False value indicative of intersection/no intersection.

The results may be returned to the SM, the traversal logic 712 and/or the stack management unit 740 for performing further tests in the ray-primitive test path and/or the ray-complet test path of the TTU based on the results. The intersection results may include information on intersection position of the ray. For example, the intersection results may include a lowest t-min value for all intersected boxes in the multi-box bounding volume.

Example Hardware Implementation of RCT 710 and TL 712

The multi-box mechanism is implemented efficiently in the ray-complet test (RCT) 710 and traversal logic (TL) 712 portions of the TTU 138 of FIGS. 9 & 12. On the surface, it is simply an OR of box intersections for multiple boxes in a set into the hit result of a single child, while also finding the lowest t-min intersection of all the boxes in the set for t reporting purposes (see FIG. 9). In RCT 710, all boxes are operated on in individual lanes 1202 just as if there were no multi-box. The settings for multi-box are decoded in RCT 710 and passed to TL 712.

Figure 15:
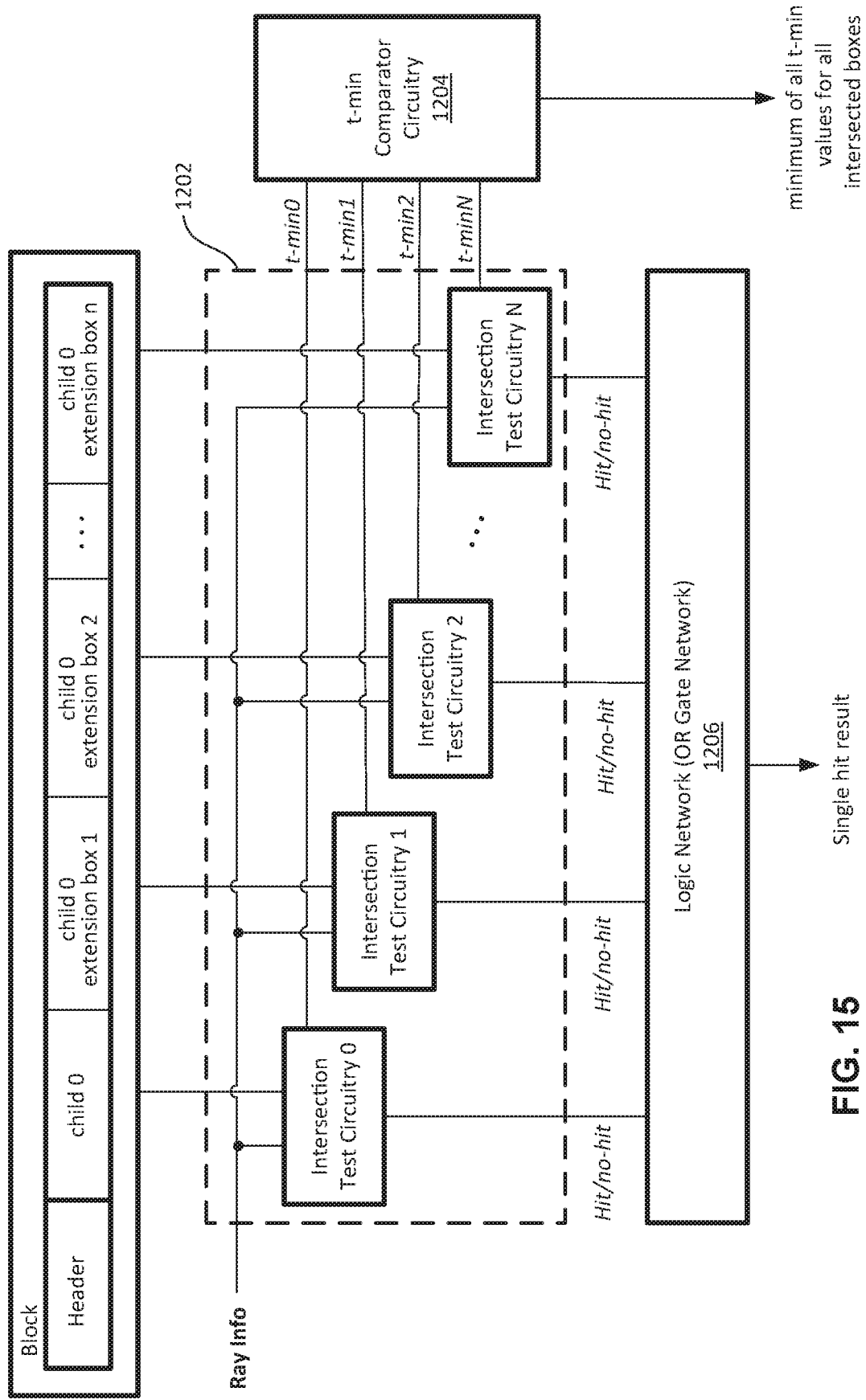
FIG. 15 shows example wide complet intersection test hardware.

FIG. 15 illustrates a hardware that may perform the ray-complet intersection test according to an exemplary embodiment of this disclosure. The hardware circuitry may be included in the TTU 138. The hardware circuitry may include ray-complet intersection test circuitry 1202, t-min comparator circuitry 1204, and a logic network 1206 (e.g., OR Gate network). The hardware circuitry shown in FIG. 9 may receive ray information and a complet and provide a single hit result and t-min value for each child. The complet may be provide in a multi-box complet format. In some examples, at least a portion of the hardware circuitry for performing the ray-complet intersection test may be included in and/or between the ray-complet test block 710 and/or traversal logic 712.

For correct reporting of t-min value, the reported t-min should be the minimum of all t-min values for all intersected boxes. FIG. 16 shows an example such t-min comparator circuit 1204. In the example non-limiting embodiment, the t-min comparator network 1204 comes at the end of the RCT 710 pipeline before the t-min value is generated for each box. For each multi-box, RCT 710 will find the minimum t-min value and swap that value into the lowest ordinal child in the multi-box before presenting the results to TL 712.

As shown in FIG. 12, ray information and a block of data (e.g., a cacheline-sized block) including a header and child information are provided to the hardware circuitry. The child information is provided in a predetermined number of sub-blocks (N+1), each sub-block identifying a child (e.g., a bounding volume of the child) or a box of a multi-box child (e.g., a bounding volume of the multi-box child box).

The ray information and information from each of the sub-blocks is provided to the ray-complet intersection test circuitry 1202. The ray-complet intersection test circuitry 1202 is configured to receive the ray information and the sub block information and determine if the ray intersects a bounding volume identified in each sub block. As shown in FIG. 15, the ray-complet intersection test circuitry 1202 may include dedicated circuitry associated with each sub-block identifying a child bounding volume or a box of a multi-box child, so that the bounding volumes identified in each sub-block can be processed simultaneously in parallel. In other example embodiments, the intersection test for each sub-block performed by the ray-complet intersection test circuitry 1202 can be performed in series, in a sequence, in stages, or in a pipeline. In such non-parallel implementations, testing of further ones of the multiboxes associated with particular geometry could be avoided as soon as one of the multi-boxes is found to interest the ray.

For each sub-block, the ray-complet intersection test circuitry 1202 may identify whether there is a hit or no-hit (e.g., indicated by 0 or 1 in a hit/miss bit) and a t-min value of the intersection. The t-min value indicates a position along the ray where the ray first intersects the bounding volume from the ray origin.

The logic network 1206 is configured to receive the hit/no-hit results for each sub-block and return a single hit result for each child. The logic network 1206 (which may be part of TL 712) is configured to return a single hit result for a child even if a plurality of boxes of a multi-box child are determined to be intersected by the ray. In the case where each sub-block in the block identifies a bounding volume, the logic network 1206 may simply pass through the results for each sub block. In the case where two or more sub-blocks identify bounding volumes of a same child node, the logic network 1206 may return a single hit if at least one bounding volume of the same child node is determined to be intersected by the ray.

The logic network 1206 may receive information from the header identifying a number of child nodes in the block of data and/or a number of multi-boxes in each child node identified in the block of data. Based on this information, the logic network 1206 is configured to group the hit/no-hit results such that a hit is provided for each child when at least one multi-box in a child is determined to be intersected by the ray.

The logic network 1206 may include an OR gate (or NOR gate) network that is configured based on the number of child nodes in the block and/or a number of multi-boxes in each child node. For example, in the case where each child is identified with two sub-blocks (each sub-block identifying a bounding volume of the same child node), an OR (NOR) gate may receive hit/no-hit results from two intersection test circuits and return a hit for the child when one or both of the two intersection test circuits indicates a hit for the tested bounding volume.

The t-min comparator circuitry 1204 is configured to receive a t-min value from each bounding volume determined to be intersected by the ray, and return a t-min value for each child. Similar to the logic network 1206, the t-min comparator circuitry 1204 may receive information from the header identifying a number of child nodes in the block of data and/or a number of multi-boxes in each child node identified in the block of data. Based on this information, the t-min comparator circuitry 1204 is configured to determine a minimum of all t-min value for all intersected boxes of a child. In one example, the t-min comparator circuitry 1204 is configured to find, for each box of a multi-box complet, the minimum t-min value and swap that value into the lowest ordinal child in the multi-box before presenting the results.

The t-min comparator circuitry 1204 reporting the minimum t-min value for the child provides for the ray shortening to a closest ray intersection point from the ray origin for each bounding volumes identified by boxes in the multi-box child. While including the t-min comparator circuitry 1204 may add an additional pipestage to the ray-complet test path of the TTU in one embodiment, shortening the length of the ray based on the t-min value may reduce computations needed when further child nodes of the intersected child node and/or primitives of the intersected child node are tested for intersection by the ray.

In the above examples, the hardware is configured to return ray-complet intersection results without reporting each intersected bounding volume identified in the block and associated with a child node and/or each t-min value of the intersections for the child node. As discussed above, the single hit or no hit is provided for each child node even when a plurality of bounding volumes associated with the child are intersected, and a minimum t-min value from a plurality of t-min values is provided for each intersected child node.

For correct reporting of t-min value (which in example embodiments is used to determine which geometry to check first when performing the ray-primitive intersection test, and may also be used to perform filtering based on tmin), the reported t-min should be the minimum of all t-min values for all intersected boxes. The t-min comparator network comes at the end of the ray-complet test pipeline before the t-min value is generated for each box. For each multi-box, ray-complet test will find the minimum t-min value and swap that value into the lowest ordinal child in the multi-box before presenting the results to TL.

Table 1 and FIG. 16 (please also refer to FIG. 8) show an example non-limiting layout of the FIG. 12 comparator network 1204 for a block including twelve sub-blocks where, e.g., [0,1] is a comparison and select between t-min of child 0 and 1 whose output is '01' and is used in lower layers:

TABLE 1

| Layer | Contents |
| --- | --- |
| Layer 1 (2 box answer): | [0, 1] [2, 3] [4, 5] [6, 7] [8, 9] [A, B] |
| Layer 2a (3 box answer): | [01, 2] [3, 45] [67, 8] [9, AB] |
| Layer 2b (4 box answer): | [01, 23] [45, 67] [89, AB] |
| Layer 3 (6 box answer): | [0123, 45] [67, 89AB] |
| Layer 4 (12 box answer): | [012345, 6789AB] |

An example non-limiting layout of the t-min comparator network 1204, e.g., [0,1] provides a comparison and select between t-min of child 0 and 1 whose output is '01' and is used in lower layers. Making this less costly in some example embodiments is that all t-min values produced by RCT 710 have a common exponent. That means the comparison works only on mantissas.

FIG. 17 shows example pseudo-code for one example implementation of the beginning of a process performed by TL 712. As shown, at the beginning of TL 712, the resulting hit/no-hit are ORed together. This function represented by an OR (or NOR) gate network 1206 shown in FIG. 15 is part of the TL 712. The output of OR (NOR) gate network 1206 is used to determine whether any of the multi-boxes are found to intersect the ray. If any box in a set is intersected, then that child is treated as a hit. As FIG. 17 illustrates, there are many different possible implementations for this functionality including OR NOR gates, one or more lookup tables, a pipelined/staged hardware state machine, etc.

In example non-limiting embodiments, Ray Ops are valid for only the primary (numerically lowest) child in a set of explicated plurality of bounding volumes. All other Ray Ops are unused and reserved at this time. However, in the future, it may be possible to perform different ray operations on different ones of these bounding volumes e.g., to generate information additional to intersection.

Ray-Primitive Intersection Testing

Referring again to FIG. 12, the TTU 138 also has the ability to accelerate intersection tests that determine whether a ray intersects particular geometry or primitives enclosed by multi-box bounding volumes. For some cases in which multi-box is used, the geometry is sufficiently complex (e.g., defined by curves or other abstract constructs as opposed to e.g., vertices) that TTU 138 in some embodiments may not be able to help with the ray-primitive intersection testing. In such cases, the TTU 138 simply reports the ray-complet intersection test results to the SM 132, and the SM 132 performs the ray-primitive intersection test itself. In other cases (e.g., triangles), the TTU 138 can perform the ray-triangle intersection test itself, thereby further increasing performance of the overall ray tracing process. For sake of completeness, the following describes how the TTU 138 can perform or accelerate the ray-primitive intersection testing.

As explained above, leaf nodes (and in particular, multi-boxes associated with such leaf nodes) found to be intersected by the ray identify (enclose) primitives that may or may not be intersected by the ray. One option is for the TTU 138 to provide e.g., a range of geometry identified in the intersected leaf nodes to the SM 132 for further processing. For example, the SM 132 may itself determine whether the identified primitives are intersected by the ray based on the information the TTU 138 provides as a result of the TTU traversing the BVH. To offload this processing from the SM 132 and thereby accelerate it using the hardware of the TTU 138, the stack management block 740 may issue requests for the ray-primitive and transform block 720 to perform a ray-primitive test for the primitives within intersected leaf nodes the TTU's ray-complet test block 710 identified. In some embodiments, the SM 132 may issue a request for the ray-primitive test to test a specific range of primitives and transform block 720 irrespective of how that geometry range was identified.

After making sure the primitive data needed for a requested ray-primitive test is available in the primitive cache 754, the ray-primitive and transform block 720 may determine primitives that are intersected by the ray using the ray information stored in the ray management block 730. The ray-primitive test block 720 provides the identification of primitives determined to be intersected by the ray to the intersection management block 722.

The intersection management block 722 can return the results of the ray-primitive test to the SM 132. The results of the ray-primitive test may include identifiers of intersected primitives, the distance of intersections from the ray origin and other information concerning properties of the intersected primitives. In some embodiments, the intersection management block 722 may modify an existing ray-primitive test (e.g., by modifying the length of the ray) based on previous intersection results from the ray-primitive and transform block 720.

The intersection management block 722 may also keep track of different types of primitives. For example, the different types of triangles include opaque triangles that will block a ray when intersected and alpha triangles that may or may not block the ray when intersected or may require additional handling by the SM. Whether a ray is blocked or not by a transparent triangle may for example depend on texture(s) mapped onto the triangle, area of the triangle occupied by the texture and the way the texture modifies the triangle. For example, transparency (e.g., stained glass) in some embodiments requires the SM 132 to keep track of transparent object hits so they can be sorted and shaded in ray-parametric order, and typically don't actually block the ray. Meanwhile, alpha "trimming" allows the shape of the primitive to be trimmed based on the shape of a texture mapped onto the primitive for example, cutting a leaf shape out of a triangle. (Note that in raster graphics, transparency is often called "alpha blending" and trimming is called "alpha test"). In other embodiments, the TTU 138 can push transparent hits to queues in memory for later handling by the SM 132 and directly handle trimmed triangles by sending requests to the texture unit. Each triangle may include a designator to indicate the triangle type. The intersection management block 722 is configured to maintain a result queue for tracking the different types of intersected triangles. For example, the result queue may store one or more intersected opaque triangle identifiers in one queue and one or more transparent triangle identifiers in another queue.

For opaque triangles, the ray intersection for less complex geometry can be fully determined in the TTU 138 because the area of the opaque triangle blocks the ray from going past the surface of the triangle. For transparent triangles, ray intersections cannot in some embodiments be fully determined in the TTU 138 because TTU 138 performs the intersection test based on the geometry of the triangle and may not have access to the texture of the triangle and/or area of the triangle occupied by the texture (in other embodiments, the TTU may be provided with texture information by the texture mapping block of the graphics pipeline). To fully determine whether the triangle is intersected, information about transparent triangles the ray-primitive and transform block 720 determines are intersected may be sent to the SM 132, for the SM to make the full determination as to whether the triangle affects visibility along the ray.

The SM 132 can resolve whether or not the ray intersects a texture associated with the transparent triangle and/or whether the ray will be blocked by the texture. The SM 132 may in some cases send a modified query to the TTU 138 (e.g., shortening the ray if the ray is blocked by the texture) based on this determination. In one embodiment, the TTU 138 may be configured to return all triangles determined to intersect the ray to the SM 132 for further processing. Because returning every triangle intersection to the SM 132 for further processing is costly in terms of interface and thread synchronization, the TTU 138 may be configured to hide triangles which are intersected but are provably capable of being hidden without a functional impact on the resulting scene. For example, because the TTU 138 is provided with triangle type information (e.g., whether a triangle is opaque or transparent), the TTU 138 may use the triangle type information to determine intersected triangles that are occluded along the ray by another intersecting opaque triangle and which thus need not be included in the results because they will not affect the visibility along the ray. If the TTU 138 knows that a triangle is occluded along the ray by an opaque triangle, the occluded triangle can be hidden from the results without impact on visualization of the resulting scene.

The intersection management block 722 may include a result queue for storing hits that associate a triangle ID and information about the point where the ray hit the triangle. When a ray is determined to intersect an opaque triangle, the identity of the triangle and the distance of the intersection from the ray origin can be stored in the result queue. If the ray is determined to intersect another opaque triangle, the other intersected opaque triangle can be omitted from the result if the distance of the intersection from the ray origin is greater than the distance of the intersected opaque triangle already stored in the result queue. If the distance of the intersection from the ray origin is less than the distance of the intersected opaque triangle already stored in the result queue, the other intersected opaque triangle can replace the opaque triangle stored in the result queue. After all of the triangles of a query have been tested, the opaque triangle information stored in the result queue and the intersection information may be sent to the SM 132.

In some embodiments, once an opaque triangle intersection is identified, the intersection management block 722 may shorten the ray stored in the ray management block 730 so that bounding volumes (which may include triangles) behind the intersected opaque triangle (along the ray) will not be identified as intersecting the ray.

The intersection management block 722 may store information about intersected transparent triangles in a separate queue. The stored information about intersected transparent triangles may be sent to the SM 132 for the SM to resolve whether or not the ray intersects a texture associated with the triangle and/or whether the texture blocks the ray. The SM may return the results of this determination to the TTU 138 and/or modify the query (e.g., shorten the ray if the ray is blocked by the texture) based on this determination.

As discussed above, the TTU 138 allows for quick traversal of an acceleration data structure (e.g., a BVH) to determine which primitives (e.g., triangles used for generating a scene) in the data structure are intersected by a query data structure (e.g., a ray). For example, the TTU 138 may determine which triangles in the acceleration data structure are intersected by the ray and return the results to the SM 132. However, returning to the SM 132 a result on every triangle intersection is costly in terms of interface and thread synchronization. The TTU 138 provides a hardware logic configured to hide those items or triangles which are provably capable of being hidden without a functional impact on the resulting scene. The reduction in returns of results to the SM and synchronization steps between threads greatly improves the overall performance of traversal. The example non-limiting embodiments of the TTU 138 disclosed in this application provides for some of the intersections to be discarded within the TTU 138 without SM 132 intervention so that less intersections are returned to the SM 132 and the SM 132 does not have to inspect all intersected triangles or item ranges.

Example Instancing Pipeline Implementation By TTU 138 and SM 132

As discussed above, one example feature of embodiments herein relates to hoisting multiboxes from lower levels to higher levels of the acceleration structure. This is commonly done in example embodiments through instance transforms. For sake of completeness, the following describes how TTU 138 in example embodiments performs instancing and associated transforms.

Figure 18A:
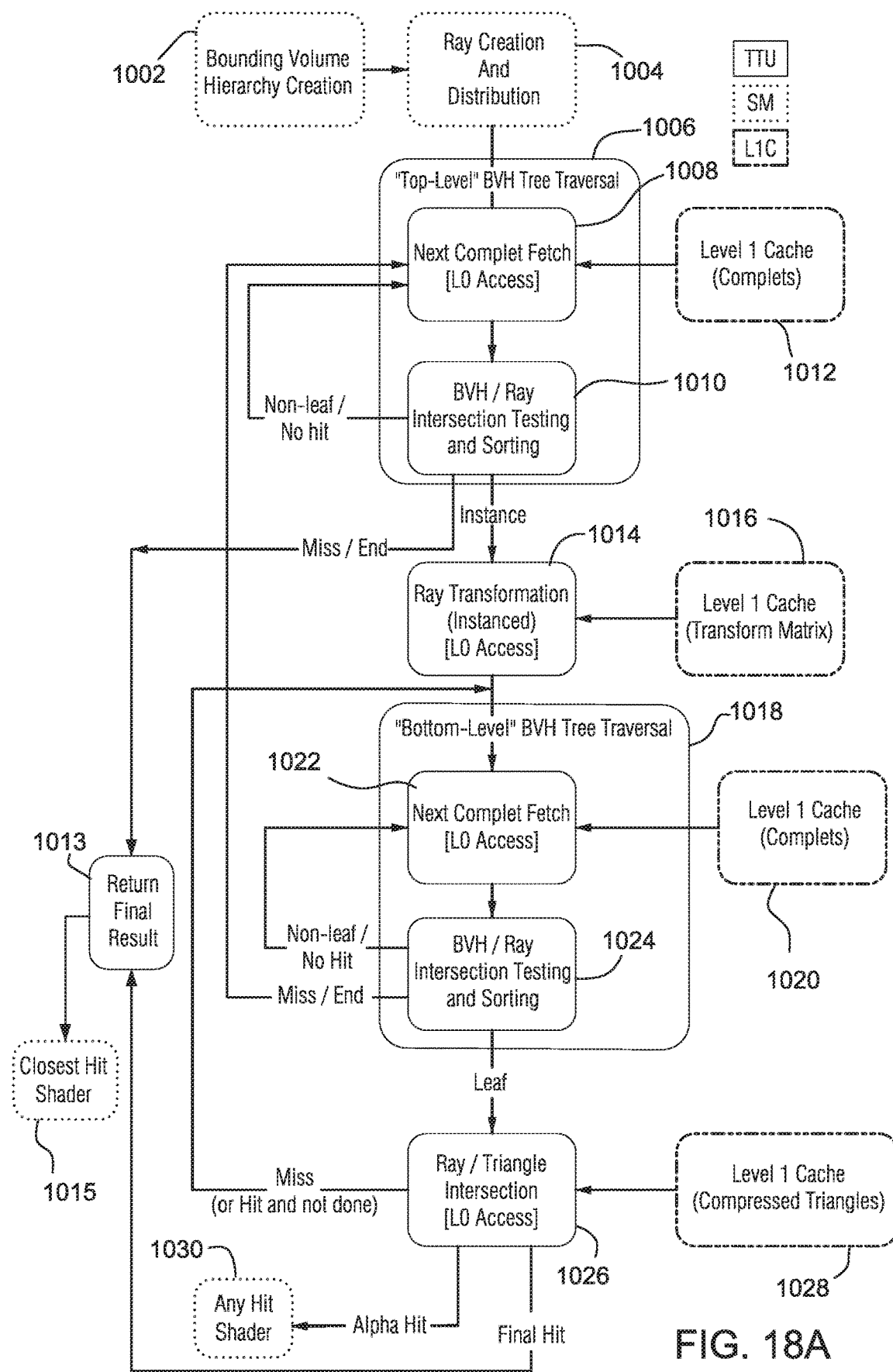
FIGS. 18A and 18B illustrate more detailed ray tracing pipelines.

The FIG. 18A more detailed diagram of a ray-tracing pipeline flowchart shows the data flow and interaction between components for a representative use case: tracing rays against a scene containing geometric primitives, with instance transformations handled in hardware. In one example non-limiting embodiment, the ray-tracing pipeline of FIG. 18A is essentially software-defined (which in example embodiments means it is determined by the SMs 132) but makes extensive use of hardware acceleration by TTU 138. Key components include the SM 132 (and the rest of the compute pipeline), the TTU 138 (which serves as a coprocessor to SM), and the L1 cache and downstream memory system, from which the TTU fetches BVH and triangle data.

The pipeline shown in FIG. 18A shows that bounding volume hierarchy creation 1002 can be performed ahead of time by a development system. It also shows that ray creation and distribution 1004 are performed or controlled by the SM 132 or other software in the example embodiment, as shading (which can include lighting and texturing). The example pipeline includes a "top level" BVH tree traversal 1006, ray transformation 1014, "bottom level" BVH tree traversal 1018, and a ray/triangle (or other primitive) intersection 1026 that are each performed by the TTU 138. These do not have to be performed in the order shown, as handshaking between the TTU 138 and the SM 132 determines what the TTU 138 does and in what order.

The SM 132 presents one or more rays to the TTU 138 at a time. Each ray the SM 132 presents to the TTU 138 for traversal may include the ray's geometric parameters, traversal state, and the ray's ray flags, mode flags and ray operations information. In an example embodiment, a ray operation (RayOp) provides or comprises an auxiliary arithmetic and/or logical test to suppress, override, and/or allow storage of an intersection. The traversal stack may also be used by the SM 132 to communicate certain state information to the TTU 138 for use in the traversal. A new ray query may be started with an explicit traversal stack. For some queries, however, a small number of stack initializers may be provided for beginning the new query of a given type, such as, for example: traversal starting from a complet; intersection of a ray with a range of triangles; intersection of a ray with a range of triangles, followed by traversal starting from a complet; vertex fetch from a triangle buffer for a given triangle, etc. In some embodiments, using stack initializers instead of explicit stack initialization improves performance because stack initializers require fewer streaming processor registers and reduce the number of parameters that need to be transmitted from the streaming processor to the TTU.

In the example embodiment, a set of mode flags the SM 132 presents with each query (e.g., ray) may at least partly control how the TTU 138 will process the query when the query intersects the bounding volume of a specific type or intersects a primitive of a specific primitive type. The mode flags the SM 132 provides to the TTU 138 enable the ability by the SM and/or the application to e.g., through a RayOp, specify an auxiliary arithmetic or logical test to suppress, override, or allow storage of an intersection. The mode flags may for example enable traversal behavior to be changed in accordance with such aspects as, for example, a depth (or distance) associated with each bounding volume and/or primitive, size of a bounding volume or primitive in relation to a distance from the origin or the ray, particular instances of an object, etc. This capability can be used by applications to dynamically and/or selectively enable/disable sets of objects for intersection testing versus specific sets or groups of queries, for example, to allow for different versions of models to be used when application state changes (for example, when doors open or close) or to provide different versions of a model which are selected as a function of the length of the ray to realize a form of geometric level of detail, or to allow specific sets of objects from certain classes of rays to make some layers visible or invisible in specific views.

In addition to the set of mode flags which may be specified separately for the ray-complet intersection and for ray-primitive intersections, the ray data structure may specify other RayOp test related parameters, such as ray flags, ray parameters and a RayOp test. The ray flags can be used by the TTU 138 to control various aspects of traversal behavior, back-face culling, and handling of the various child node types, subject to a pass/fail status of an optional RayOp test. RayOp tests add flexibility to the capabilities of the TTU 138, at the expense of some complexity. The TTU 138 reserves a "ray slot" for each active ray it is processing, and may store the ray flags, mode flags and/or the RayOp information in the corresponding ray slot buffer within the TTU during traversal.

In the example shown in FIG. 18A, the TTU 138 performs a top level tree traversal 1006 and a bottom level tree traversal 1018. In the example embodiment, the two level traversal of the BVH enables fast ray tracing responses to dynamic scene changes. As discussed above, it is possible to hoist multi-box complet information from the bottom level tree traversal 1018 to the top level tree traversal 1006. This enables alignment for a single primitive to be more tightly fit in its own object space, and then placed in a common world space e.g., via a transform by the BVH builder while reducing the number of instance transforms the TTU 138 needs to perform during real time ray tracing operations.

Ray transformation 1014 provides the appropriate transition from the top level tree traversal 1006 to the bottom level tree traversal 1018 by transforming the ray, which may be used in the top level traversal in a first coordinate space (e.g., world space), to a different coordinate space (e.g., object space) of the BVH of the bottom level traversal. An example BVH traversal technique using a two level traversal is described in previous literature, see, e.g., Woop, "A Ray Tracing Hardware Architecture for Dynamic Scenes", Universitat des Saarlandes, 2004, but embodiments are not limited thereto.

Example Top Level Tree Traversal

The top level tree traversal 1006 by TTU 138 receives complets from the L1 cache 1012, and provides an instance to the ray transformation 1014 for transformation, or a miss/end output 1013 to the SM 132 for closest hit shader 1015 processing by the SM (this block can also operate recursively based on non-leaf nodes/no hit conditions). In the top level tree traversal 1006, a next complet fetch step 1008 fetches the next complet to be tested for ray intersection in step 1010 from the memory and/or cache hierarchy and ray-bounding volume intersection testing is done on the bounding volumes in the fetched complet.

Figure 18B:
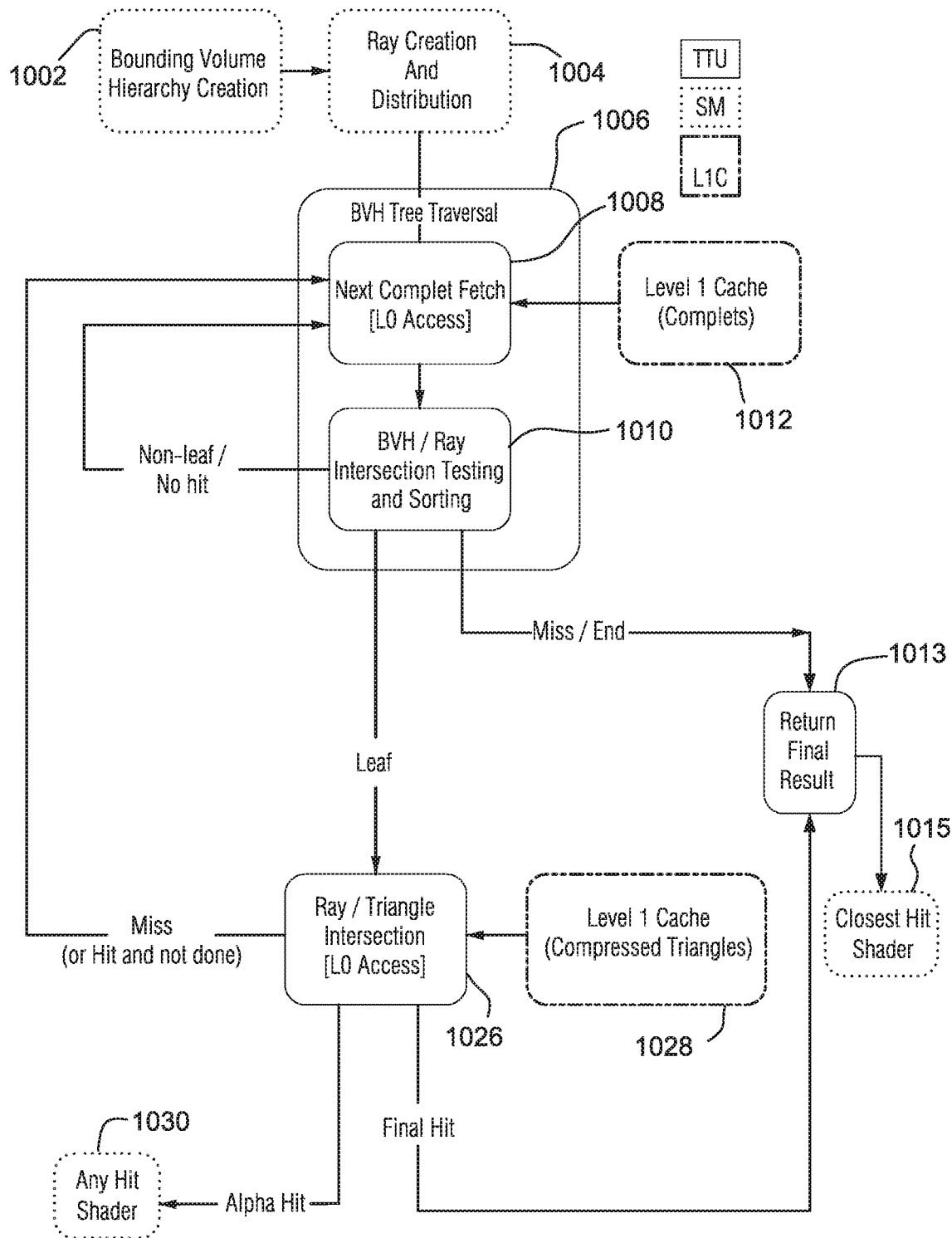

As described above, an instance node connects one BVH to another BVH which is in a different coordinate system. When a child of the intersected bounding volume is an instance node, the ray transformation 1014 is able to retrieve an appropriate transform matrix from the L1 cache 1016. The TTU 138, using the appropriate transform matrix, transforms the ray to the coordinate system of the child BVH. U.S. patent application Ser. No. 14/697,480, which is already incorporated by reference, describes transformation nodes that connect a first set of nodes in a tree to a second set of nodes where the first and second sets of nodes are in different coordinate systems. The instance nodes in example embodiments may be similar to the transformation nodes in U.S. application Ser. No. 14/697,480. In an alternative, non-instancing mode of TTU 138 shown in FIG. 18B, the TTU does not execute a "bottom" level tree traversal 1018 and noninstanced tree BVH traversals are performed by blocks 1008, 1010 e.g., using only one stack. The TTU 138 can switch between the FIG. 18A instanced operations and the FIG. 18B non-instanced operations based on what it reads from the BVH and/or query type. For example, a specific query type may restrict the TTU to use just the non-instanced operations. In such a query, any intersected instance nodes would be returned to the SM.

In some non-limiting embodiments, ray-bounding volume intersection testing in step 1010 is performed on each bounding volume in the fetched complet before the next complet is fetched. Other embodiments may use other techniques, such as, for example, traversing the top level traversal BVH in a depth-first manner. U.S. Pat. No. 9,582,607, already incorporated by reference, describes one or more complet structures and contents that may be used in example embodiments. U.S. Pat. No. 9,582,607 also describes an example traversal of complets.

When abounding volume is determined to be intersected by the ray, the child bounding volumes (or references to them) of the intersected bounding volume are kept track of for subsequent testing for intersection with the ray and for traversal. In example embodiments, one or more stack data structures is used for keeping track of child bounding volumes to be subsequently tested for intersection with the ray. In some example embodiments, a traversal stack of a small size may be used to keep track of complets to be traversed by operation of the top level tree traversal 1006, and primitives to be tested for intersection, and a larger local stack data structure can be used to keep track of the traversal state in the bottom level tree traversal 1018. It should be noted that in the case of internal nodes with multi-box attributes, each of the multi-boxes do not spawn children nodes or other descendent nodes. Rather, if a downward traversal is required, the larger AABB bounding volume that encompasses all of the multi-boxes would generally be the bounding volume that spawns further child bounding boxes, grandchild bounding boxes, etc. Hence, in at least some embodiments, multi-boxes do not have child nodes—either because they are leaf nodes that have no children, or because they are associated with internal nodes that use larger bounding volumes for node inheritance.

Example Bottom Level Tree Traversal

In the bottom level tree traversal 1018, a next complet fetch step 1022 fetches the next complet to be tested for ray intersection in step 1024 from the memory and/or cache hierarchy 1020 and ray-bounding volume intersection testing is done on the bounding volumes in the fetched complet. The bottom level tree traversal, as noted above, may include complets with bounding volumes in a different coordinate system than the bounding volumes traversed in the upper level tree traversal. The bottom level tree traversal also receives complets from the L1 cache and can operate recursively or iteratively within itself based on non-leaf/no-hit conditions and also with the top level tree traversal 1006 based on miss/end detection. Intersections of the ray with the bounding volumes in the lower level BVH may be determined with the ray transformed to the coordinate system of the lower level complet retrieved. The leaf bounding volumes found to be intersected by the ray in the lower level tree traversal are then provided to the ray/triangle intersection 1026.

The leaf outputs of the bottom level tree traversal 1018 are provided to the ray/triangle intersection 1026 (which has L0 cache access as well as ability to retrieve triangles via the L1 cache 1028). The L0 complet and triangle caches may be small read-only caches internal to the TTU 138. The ray/triangle intersection 1026 may also receive leaf outputs from the top level tree traversal 1006 when certain leaf nodes are reached without traversing an instanced BVH.

After all the primitives in the primitive range have been processed, the Intersection Management Unit inspects the state of the result Queue and crafts packets to send to the Stack Management Unit and/or Ray Management Unit to update the ray's attributes and traversal state, set up the ray's next traversal step, and/or return the ray to the SM 132 (if necessary). If the result queue contains opaque or alpha intersections found during the processing of the primitive range then the Intersection Management Unit signals the parametric length (t) of the nearest opaque intersection in the result queue to the ray management unit to record as the ray's tmax to shorten the ray. To update the traversal state to set up the ray's next traversal step the Intersection Management Unit signals to the Stack Management Unit whether an opaque intersection from the primitive range is present in the resultQueue, whether one or more alpha intersections are present in the result queue, whether the resultQueue is full, whether additional alpha intersections were found in the primitive range that have not been returned to the SM and which are not present in the resultQueue, and the index of the next alpha primitive in the primitive range for the ray to test after the SM consumes the contents of the resultQueue (the index of the next primitive in the range after the alpha primitive with the highest memory-order from the current primitive range in the result queue).

When the Stack Management Unit 740 receives the packet from Intersection Management Unit 722, the Stack Management Unit 740 inspects the packet to determine the next action required to complete the traversal step and start the next one. If the packet from Intersection Management Unit 722 indicates an opaque intersection has been found in the primitive range and the ray mode bits indicate the ray is to finish traversal once any intersection has been found the Stack Management Unit 740 returns the ray and its results queue to the SM with traversal state indicating that traversal is complete (a done flag set and/or an empty top level and bottom level stack). If the packet from Intersection Management Unit 722 indicates that there are opaque or alpha intersection in the result queue and that there are remaining alpha intersections in the primitive range not present in the result queue that were encountered by the ray during the processing of the primitive range that have not already been returned to the SM, the Stack Management Unit 740 returns the ray and the result queue to the SM with traversal state modified to set the cull opaque bit to prevent further processing of opaque primitives in the primitive range and the primitive range starting index advanced to the first alpha primitive after the highest alpha primitive intersection from the primitive range returned to the SM in the ray's result queue. If the packet from Intersection Management Unit 722 indicates that no opaque or alpha intersections were found when the ray processed the primitive range the Stack Management Unit 740 pops the top of stack entry (corresponding to the finished primitive range) off the active traversal stack. If the packet from Stack Management Unit 740 indicates or that either there are opaque intersections in the result queue and the ray mode bits do not indicate that the ray is to finish traversal once any intersection has been found and/or there are alpha intersections in the result queue, but there were no remaining alpha intersections found in the primitive range not present in the result queue that have not already been returned to the SM, the Stack Management Unit 740 pops the top of stack entry (corresponding to the finished primitive range) off the active traversal stack and modifies the contents of the result queue to indicate that all intersections present in the result queue come from a primitive range whose processing was completed.

If the active stack is the bottom stack, and the bottom stack is empty the Stack Management Unit 740 sets the active stack to the top stack. If the top stack is the active stack, and the active stack is empty, then the Stack Management Unit 740 returns the ray and its result queue to the SM with traversal state indicating that traversal is complete (a done flag set and/or an empty top level and bottom level stack). If the active stack contains one or more stack entries, then the Stack Management Unit 740 inspects the top stack entry and starts the next traversal step. Testing of primitive and/or primitive ranges for intersections with a ray and returning results to the SM 132 are described in co-pending U.S. application Ser. No. 16/101,148 entitled "Conservative Watertight Ray Triangle Intersection" and U.S. application Ser. No. 16/101,196 entitled "Method for Handling Out-of-Order Opaque and Alpha Ray/Primitive Intersections", which are hereby incorporated by reference in their entireties.

Example Image Generation Pipeline Including Ray Tracing

While the above disclosure is framed in the specific context of computer graphics and visualization, ray tracing and the disclosed TTU could be used for a variety of applications beyond graphics and visualization. Non-limiting examples include sound propagation for realistic sound synthesis, simulation of sonar systems, design of optical elements and systems, particle transport simulation (e.g., for medical physics or experimental high-energy physics), general wave propagation simulation, comparison to LIDAR data for purposes e.g., of robot or vehicle localization, and others. OptiX™ has already been used for some of these application areas in the past.

For example, the ray tracing and other capabilities described above can be used in a variety of ways. For example, in addition to being used to render a scene using ray tracing, they may be implemented in combination with scan conversion techniques such as in the context of scan converting geometric building blocks (i.e., polygon primitives such as triangles) of a 3D model for generating image for display (e.g., on display 150 illustrated in FIG. 9).

Figure 19:
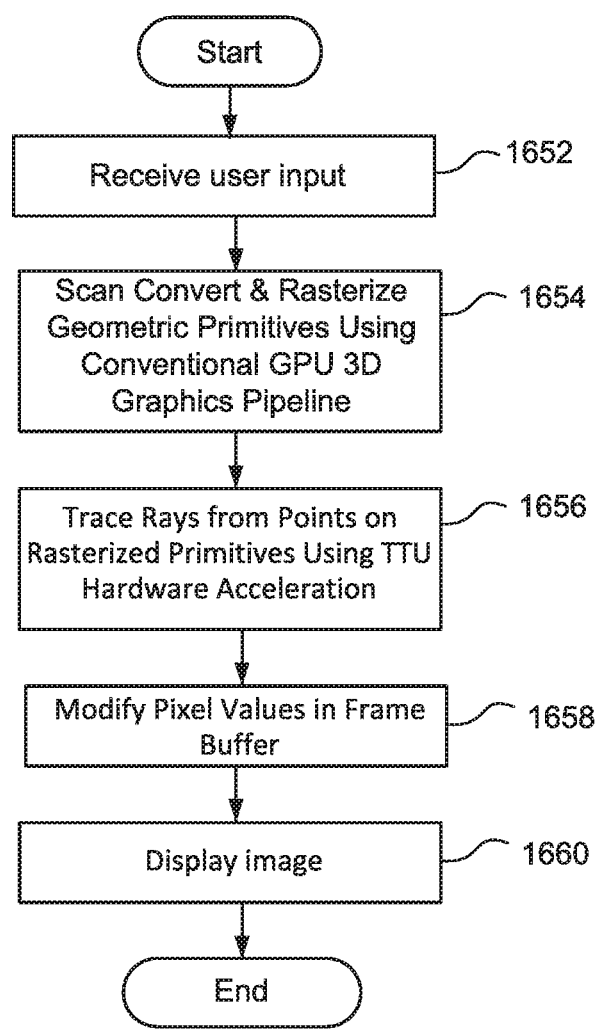
FIG. 19 is a flowchart of an example process to generate an image.

Meanwhile, however, the technology herein provides advantages when used to produce images for virtual reality, augmented reality, mixed reality, video games, motion and still picture generation, and other visualization applications. FIG. 19 illustrates an example flowchart for processing primitives to provide image pixel values of an image, in accordance with an embodiment. As FIG. 19 shows, an image of a 3D model may be generated in response to receiving a user input (Step 1652). The user input may be a request to display an image or image sequence, such as an input operation performed during interaction with an application (e.g., a game application). In response to the user input, the system performs scan conversion and rasterization of 3D model geometric primitives of a scene using conventional GPU 3D graphics pipeline (Step 1654). The scan conversion and rasterization of geometric primitives may include for example processing primitives of the 3D model to determine image pixel values using conventional techniques such as lighting, transforms, texture mapping, rasterization and the like as is well known to those skilled in the art. The generated pixel data may be written to a frame buffer.

In step 1656, one or more rays may be traced from one or more points on the rasterized primitives using TTU hardware acceleration. The rays may be traced in accordance with the one or more ray-tracing capabilities disclosed in this application. Based on the results of the ray tracing, the pixel values stored in the buffer may be modified (Step 1658). Modifying the pixel values may in some applications for example improve the image quality by, for example, applying more realistic reflections and/or shadows. An image is displayed (Step 1660) using the modified pixel values stored in the buffer.

In one example, scan conversion and rasterization of geometric primitives may be implemented using the processing system described above, and ray tracing may be implemented by the SM's 132 using the TTU architecture described in relation to FIG. 12, to add further visualization features (e.g., specular reflection, shadows, etc.). FIG. 19 is just a non-limiting example—the SM's 132 could employ the described TTU by itself without texture processing or other conventional 3D graphics processing to produce images, or the SM's could employ texture processing and other conventional 3D graphics processing without the described TTU to produce images. The SM's can also implement any desired image generation or other functionality in software depending on the application to provide any desired programmable functionality that is not bound to the hardware acceleration features provided by texture mapping hardware, tree traversal hardware or other graphics pipeline hardware.

The TTU 138 in some embodiments is stateless, meaning that no architectural state is maintained in the TTU between queries. At the same time, it is often useful for software running on the SM 1840 to request continuation of a previous query, which implies that relevant state should be written to registers by the TTU 138 and then passed back to the TTU in registers (often in-place) to continue. This state may take the form of a traversal stack that tracks progress in the traversal of the BVH.

A small number of stack initializers may also be provided for beginning a new query of a given type, for example:
Traversal starting from a complet
Intersection of a ray with a range of triangles
Intersection of a ray with a range of triangles, followed by traversal starting from a complet
Vertex fetch from a triangle buffer for a given triangle
Optional support for instance transforms in front of the "traversal starting from a complet" and "intersection of a ray with a range of triangles".

Vertex fetch is a simple query that may be specified with request data that consists of a stack initializer and nothing else. Other query types may require the specification of a ray or beam, along with the stack or stack initializer and various ray flags describing details of the query. A ray is given by its three-coordinate origin, three-coordinate direction, and minimum and maximum values for the t-parameter along the ray. A beam is additionally given by a second origin and direction.

Various ray flags can be used to control various aspects of traversal behavior, back-face culling, and handling of the various child node types, subject to a pass/fail status of an optional rayOp test. RayOps add considerable flexibility to the capabilities of the TTU. In some example embodiments, the RayOps portion introduces two Ray Flag versions can be dynamically selected based on a specified operation on data conveyed with the ray and data stored in the complet. To explore such flags, it's first helpful to understand the different types of child nodes allowed within a BVH, as well as the various hit types that the TTU 138 can return to the SM. Example node types are:

A child complet (i.e., an internal node) (single box or multi-box)

By default, the TTU 138 continues traversal by descending into child complets.

A triangle range, corresponding to a contiguous set of triangles within a triangle buffer
(1) By default, triangle ranges encountered by a ray are handled natively by the TTU 138 by testing the triangles for intersection and shortening the ray accordingly. If traversal completes and a triangle was hit, default behavior is for the triangle ID to be returned to SM 1840, along with the t-value and barycentric coordinates of the intersection. This is the "Triangle" hit type.
(2) By default, intersected triangles with the alpha bit set are returned to SM 1840 even if traversal has not completed. The returned traversal stack contains the state required to continue traversal if software determines that the triangle was in fact transparent.
(3) Triangle intersection in some embodiments is not supported for beams, so encountered triangle ranges are by default returned to SM 1840 as a "TriRange" hit type, which includes a pointer to the first triangle block overlapping the range, parameters specifying the range, and the t-value of the intersection with the leaf bounding box.

An item range, consisting of an index (derived from a user-provided "item range base" stored in the complet) and a count of items.

By default, item ranges are returned to SM 1840 as an "ItemRange" hit type, consisting of for example an index, a count, and the t-value of the intersection with the leaf bounding box.

An instance node.

The TTU 138 in some embodiments can handle one level of instancing natively by transforming the ray into the coordinate system of the instance BVH. Additional levels of instancing (or every other level of instancing, depending on strategy) may be handled in software (or in other embodiments, the TTU 138 hardware can handle two, three or more levels of instancing). The "InstanceNode" hit type is provided for this purpose, consisting of a pointer to the instance node and the tvalue of the intersection with the leaf bounding box. In other implementations, the hardware can handle two, three or more levels of instancing.

In addition to the node-specific hit types, a generic "NodeRef" hit type is provided that consists of a pointer to the parent complet itself, as well as an ID indicating which child was intersected and the t-value of the intersection with the bounding box of that child.

An "Error" hit type may be provided for cases where the query or BVH was improperly formed or if traversal encountered issues during traversal.

A "None" hit type may be provided for the case where the ray or beam misses all geometry in the scene.

How the TTU handles each of the four possible node types is determined by a set of node-specific mode flags set as part of the query for a given ray. The "default" behavior mentioned above corresponds to the case where the mode flags are set to all zeroes.

Alternative values for the flags allow for culling all nodes of a given type, returning nodes of a given type to SM as a NodeRefhit type, or returning triangle ranges or instance nodes to SM using their corresponding hit types, rather than processing them natively within the TTU 138.

Additional mode flags may be provided for control handling of alpha triangles.

All patents & publications cited above are incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:
1. A ray tracing device comprising:
   memory configured to store at least a portion of an acceleration data structure specifying:
   (a) in an instance space, plural bounding volumes bounding different portions of a primitive, and
   (b) a transform between the instance space and an object space in which geometry of the primitive is defined; and
   circuitry operatively coupled to the memory configured to perform operations comprising:
      read at least the portion of the acceleration data structure from the memory;
      receive information about a ray;
      test, in the instance space, whether the ray intersects any of the plural bounding volumes bounding the different portions of the primitive; and
      test the geometry of the primitive in the object space for intersection with the ray transformed into the object space when the test in the instance space reveals the ray intersects any of the plural bounding volumes.
2. The ray tracing device of claim 1 wherein the instance space comprises world space, and the circuitry is further configured to transform the ray from world space into the object space using the specified transform.

3. The ray tracing device of claim 1 wherein the circuitry is further configured to parallelly determine spatial correspondence in instance space between the ray and each of the plural bounding volumes.

4. The ray tracing device of claim 3 wherein the ray is defined in instance space, and the circuitry is further configured to delay transforming the ray into object space until after testing for spatial correspondence with the plural bounding volumes in instance space.

5. The ray tracing device of claim 1 wherein the acceleration data structure stored in the memory includes a top level acceleration structure specifying the plural bounding volumes in, and a bottom level acceleration structure specifying the geometry of the primitive.

6. The ray tracing device of claim 5 wherein the top level acceleration structure comprises first and second instance acceleration structures each corresponding to the bottom level acceleration structure specifying the geometry of an instanced primitive, each of the first and second instance acceleration structures specifying the plural bounding volumes bounding different portions of the primitive, the first instance acceleration structure specifying a first transform from a first instance space to the object space, the second instance acceleration structure specifying a second transform from a second instance space to the object space, the first and second instance spaces being different and the first and second transforms being different.

7. The ray tracing device of claim 1 wherein the plural bounding volumes comprise connected, disjoint or overlapping axis aligned bounding boxes.

8. The ray tracing device of claim 1 wherein the bounding volumes have different orientations in the instance space than the bounding volumes would have if the bounding volumes were transformed into the object space using the transform.

9. The ray tracing device of claim 1 wherein the plural bounding volumes bound different portions of the primitive and together completely bound the primitive more tightly than a single bounding volume.

10. The ray tracing device of claim 1 wherein the circuitry is further configured not to require the acceleration data structure to store more than one copy of the geometry of the primitive in order to avoid image artifacts.

11. A ray tracing method comprising:
    storing, in a memory, at least a portion of an acceleration data structure specifying:
    (a) in an instance space, plural bounding volumes bounding different portions of a primitive, and
    (b) a transform between the instance space and an object space in which geometry of the primitive is defined; and
    operating circuitry connected to the memory to perform operations comprising:
       reading at least the portion of the acceleration data structure from the memory;
       receiving information about a ray;
       testing, in the instance space, whether the ray intersects any of the plural bounding volumes bounding the different portions of the primitive; and
       testing the geometry of the primitive in the object space for intersection with the ray transformed into the object space when the test in the instance space reveals the ray intersects any of the plural bounding volumes.

12. The ray tracing method of claim 11 wherein the instance space comprises world space, and the circuitry further performs transforming the ray from world space into the object space using the specified transform.

13. The ray tracing method of claim 11 wherein the circuitry further performs parallelly determining spatial correspondence in instance space between the ray and each of the plural bounding volumes.

14. The ray tracing method of claim 13 wherein the ray is defined in instance space, and the circuitry further performs delaying transforming the ray into object space until after testing for spatial correspondence with the plural bounding volumes in instance space.

15. The ray tracing method of claim 11 wherein the acceleration data structure stored in the memory includes a top level acceleration structure specifying the plural bounding volumes in, and a bottom level acceleration structure specifying the geometry of the primitive.

16. The ray tracing method of claim 15 wherein the top level acceleration structure comprises first and second instance acceleration structures each corresponding to the bottom level acceleration structure specifying the geometry of an instanced primitive, each of the first and second instance acceleration structures specifying the plural bounding volumes bounding different portions of the primitive, the first instance acceleration structure specifying a first transform from a first instance space to the object space, the second instance acceleration structure specifying a second transform from a second instance space to the object space, the first and second instance spaces being different and the first and second transforms being different.

17. The ray tracing method of claim 11 wherein the plural bounding volumes comprise connected, disjoint or overlapping axis aligned bounding boxes.

18. The ray tracing method of claim 11 wherein the bounding volumes have different orientations in the instance space than the bounding volumes would have if the bounding volumes were transformed into the object space using the transform.

19. The ray tracing method of claim 11 wherein the plural bounding volumes bound different portions of the primitive and together completely bound the primitive more tightly than a single bounding volume.

20. The ray tracing method of claim 11 wherein the circuitry does not require the acceleration data structure to store more than one copy of the geometry of the primitive while avoiding image artifacts.

* * * * *